US012688353B2

(12) United States Patent
Rathod et al.

(10) Patent No.: US 12,688,353 B2
(45) Date of Patent: Jul. 21, 2026

(54) SYSTEM AND METHOD FOR MACHINE LEARNING ARCHITECTURE FOR ELECTRONIC FIELD AUTOFILL

(71) Applicant: ROYAL BANK OF CANADA, Toronto (CA)

(72) Inventors: Dharitri Rathod, Miami, FL (US); Adel Al Nabulsi, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 302 days.

(21) Appl. No.: 18/385,887

(22) Filed: Oct. 31, 2023

(65) Prior Publication Data

US 2024/0143903 A1      May 2, 2024

Related U.S. Application Data

(60) Provisional application No. 63/421,144, filed on Oct. 31, 2022.

(51) Int. Cl.
*G06F 3/048* (2013.01)
*G06F 16/951* (2019.01)
*G06F 40/174* (2020.01)

(52) U.S. Cl.
CPC .......... *G06F 40/174* (2020.01); *G06F 16/951* (2019.01)

(58) Field of Classification Search
CPC .............................. G06F 40/174; G06F 16/951
See application file for complete search history.

(56) References Cited

U.S. PATENT DOCUMENTS

| | | | | |
|---|---|---|---|---|
| 7,254,569 B2 * | 8/2007 | Goodman | ............. | G06F 40/174 |
| 11,151,311 B2 | 10/2021 | Leme | | |
| 11,475,214 B1 * | 10/2022 | Chacko | ................ | G06F 40/174 |
| 11,604,794 B1 * | 3/2023 | Nallapati | .......... | G06F 16/24522 |
| 11,797,780 B1 * | 10/2023 | Finegan | ................. | G06F 40/40 |
| 11,941,649 B2 * | 3/2024 | Wood | ................. | G06Q 30/0203 |
| 12,271,698 B1 * | 4/2025 | Wang | ............... | G06F 16/24522 |
| 2005/0257148 A1 * | 11/2005 | Goodman | ............. | G06F 40/174 |
| | | | | 715/246 |
| 2006/0061806 A1 * | 3/2006 | King | ................. | G06Q 30/0623 |
| | | | | 358/1.15 |
| 2008/0120257 A1 * | 5/2008 | Goyal | ................... | G06F 40/174 |
| | | | | 706/12 |

(Continued)

OTHER PUBLICATIONS

Hichem et al., A Machine Learning Approach for Automated Filling of Categorical Fields in Data Entry Forms, 2022, IEEE, 40 pages. (Year: 2022).*

(Continued)

*Primary Examiner* — Linh K Pham
(74) *Attorney, Agent, or Firm* — Norton Rose Fulbright Canada LLP

(57) ABSTRACT

Approaches are proposed herein for machine learning based electronic field autofill. In particular, machine learning approaches are utilized to estimate inputs for entry into fields. The machine learning approach described herein includes a proposed feature engineering approach where collected data obtained from various webpages (e.g., checkout pages) is encoded for training and inference. The approach is particularly useful in respect of providing a machine learning mechanism that is resilient in spite of inconsistent and varying approaches of implementing form fields.

20 Claims, 40 Drawing Sheets

(56)                References Cited

U.S. PATENT DOCUMENTS

| | | | | |
|---|---|---|---|---|
| 2020/0125840 A1* | 4/2020 | Geng | .................. | G06V 30/412 |
| 2021/0103975 A1* | 4/2021 | Walters | .............. | G06Q 30/0641 |
| 2021/0117857 A1* | 4/2021 | Sriharsha | .............. | G06F 16/285 |
| 2021/0383067 A1* | 12/2021 | Reisswig | ............. | G06F 16/367 |
| 2023/0139614 A1* | 5/2023 | Risuleo | ................ | G06F 40/284 |
| | | | | 715/224 |
| 2023/0161952 A1* | 5/2023 | Garimella | ................ | G06N 3/08 |
| | | | | 715/224 |
| 2023/0206096 A1* | 6/2023 | Paiement | .............. | G06N 3/047 |
| | | | | 706/52 |
| 2023/0252463 A1* | 8/2023 | Badal-Badalian | .......................... | |
| | | | | G06Q 20/3821 |
| | | | | 705/71 |
| 2023/0316145 A1* | 10/2023 | Poomari | ............. | G06N 3/0442 |
| | | | | 706/12 |
| 2025/0077618 A1* | 3/2025 | Zilka | ...................... | G06V 10/82 |

OTHER PUBLICATIONS

Mtetwa et al., Feature Selection for an SVM Based Webpage Classifier, 2017, IEEE, 4 pages (Year: 2017).*

Joy Bose, Field Label Prediction for Autofill in Web Browsers, arXiv: 1912.08809, Dec. 17, 2019.

web.Dev, Autofill, retrieved from the Internet: https://web.dev/learn/forms/autofill/, 2021.

Developers, AutofillService, retrieved from the Internet: https://developer.android.com/reference/android/service/autofill/AutofillService on Jun. 12, 2025.

Chris Castiglione, How to Automate Filling in Web Forms with Python, Learn to code in 30 Days! retrieved from the Internet: https://learn.onemonth.com/automate-web-forms-with-python/ on Jun. 12, 2025.

Lucas Soares, Automating Submission Forms with Python, towards data science, Jul. 29, 2021, retrieved from the Internet: https://towardsdatascience.com/automating-submission-forms-with-python-94459353b03e/ on Jun. 12, 2025.

Nicolo Cosimo Albanese, Multi-class Text Classification using BERT and TensorFlow, towards data science, Jan. 19, 2022, retrieved from the Internet: https://towardsdatascience.com/multi-label-text-classification-using-bert-and-tensorflow-d2e88d8f488d/ on Jun. 12, 2025.

Edward Scott, Checkout Optimization: 5 Ways to Minimize Form Fields in Checkout, Baymard Institute, Jun. 26, 2024, retrieved from the Internet: https://baymard.com/blog/checkout-flow-average-form-fields on Jun. 12, 2025.

Dashlane Support, Autofill your data using Dashlane, updated May 21, 2025, retrieved from the Internet: https://support.dashlane.com/hc/en-us/articles/202699151-Autofill-your-data-using-Dashlane on Jun. 12, 2025.

Shaohua Wang et al., An intelligent framework for auto-filling web forms from different web applications, International Journal of Business Process Integration and Management 8(1): 16, DOI: 10.1504/IJBPIM.2017.082747, Jan. 2017.

Joy Bose, Intelligent and Secure Autofill System in Web Browsers, Proceedings of the 12th International Conference on Soft Computing and Pattern Recognition (SoCPaR 2020), Apr. 16, 2021, https://link.springer.com/chapter/10.1007/978-3-030-73689-7_2.

Authors unknown, AutofillService, https://developer.android.com/reference/android/service/autofill/AutofillService, Mar. 13, 2025.

Melanie Hartmann et al., Context-Aware Form Filling for Web Applications, 2009 IEEE International Conference on Semantic Computing, Sep. 2009.

* cited by examiner

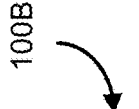
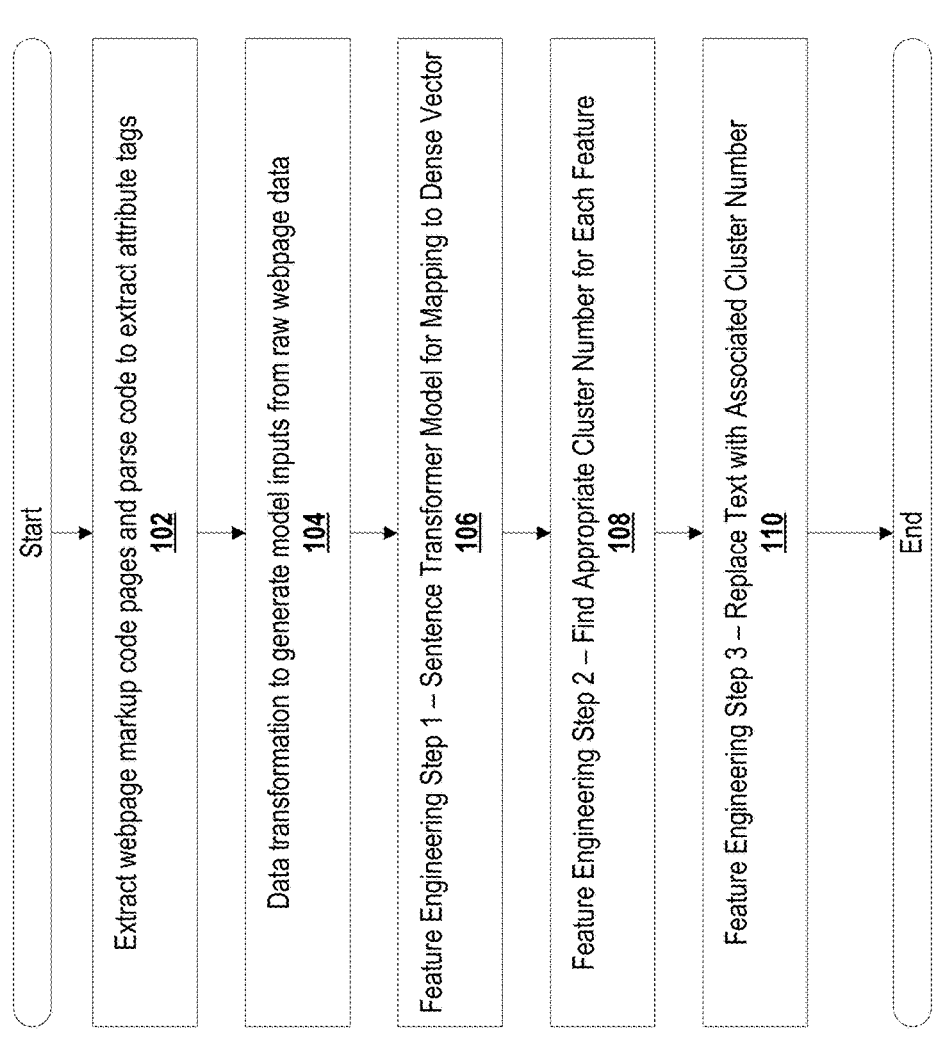
FIG. 1B

200B

500

| | placeholder | autocapitalize | spellcheck | autocomplete | data-autofocus | data-backup | aria-describedby | aria-required | class | size |
|---|---|---|---|---|---|---|---|---|---|---|
| 0 | Email | off | false | shipping email | true | customer_email | checkout-context-step-one | true | field_input | 30 |
| 10 | First name | NaN | NaN | shipping given-name | NaN | first_name | NaN | true | field_input | 30 |
| 11 | Last name | NaN | NaN | shipping family-name | NaN | last_name | NaN | true | field_input | 30 |
| 12 | Address | NaN | NaN | shipping address-line1 | NaN | address1 | NaN | true | field_input | 30 |
| 13 | Apartment, suite, etc. (optional) | NaN | NaN | shipping address-line2 | NaN | address2 | NaN | NaN | field_input | 30 |
| 14 | City | NaN | NaN | shipping address-level2 | NaN | city | NaN | true | field_input | 30 |
| 15 | Postal code | NaN | NaN | shipping postal-code | NaN | zip | NaN | true | field_input field_input-zip | 30 |
| 16 | Phone | NaN | NaN | shipping tel | NaN | phone | NaN | true | field_input field_input-numeric | 30 |

Retailer.com Checkout

Add a new shipping address

First Name

Last Name

Address line 1

Address line 2 (optional)
e.g. Apartment, Suite, RR#

City

Province/Territory
Select

Postal code

Phone

Email address

☑ Save this shipping address

```
<label for="firstName" class="css-0 evjcd1x0">First Name</label>
<input type="text" id="firstName" aria-required="true" required=""
data-automation="first-name" maxlength="31" class="css-1lo2pik
eesbt950" value="rockey">

<label for="lastName" class="css-0 evjcd1x0">Last Name</label>
<input type="text" id="lastName" aria-required="true" required=""
data-automation="last-name" maxlength="31" class="css-1lo2pik
eesbt950" value="test">

<label for="address1" class="css-0 evjcd1x0">Address line 1</
label>
<input type="text" id="address1" aria-required="true" required=""
data-automation="address1" autocomplete="new-password"
maxlength="70" class="css-1lo2pik eesbt950" value="Sub-200
Bay St">

<label for="address2" class="css-0 evjcd1x0">Address line 2</
label>
<input type="text" placeholder="e.g. Apartment, Suite, RR#" aria-
label="e.g. Apartment, Suite, RR#" id="address2" data-
automation="address2" maxlength="70" class="css-1lo2pik
eesbt950" value="">

<label for="city" class="css-0 evjcd1x0">City</label>
<input type="text" id="city" aria-required="true" required="" data-
automation="city" maxlength="35" class="css-1lo2pik eesbt950"
value="Toronto">
```

FIG. 7A

Retailer.com Checkout

Add a new shipping address

First Name

Please enter your first name

Last Name

Address line 1

Address line 2 (optional)

eg. Apartment, Suite, Unit

City

Province/Territory

Select

Postal code

Phone

Email address

☑ Save this shipping address

800

```
<label for="province" class="css-0 evjcd1x0">Province/Territory</label>
<select aria-label="Province/Territory" id="province" aria-required="true" data-
automation="province" class="css-141gpem e1tbi35p0">
<option value="" aria-label="Select">Select</option>
<option value="AB" aria-label="Alberta">Alberta</option>
<option value="BC" aria-label="British Columbia">British Columbia</
option><option value="MB" aria-label="Manitoba">Manitoba</option><option
value="NB" aria-label="New Brunswick">New Brunswick</option><option
value="NL" aria-label="Newfoundland and Labrador">Newfoundland and
Labrador</option><option value="NT" aria-label="Northwest
Territories">Northwest Territories</option><option value="NS" aria-label="Nova
Scotia">Nova Scotia</option><option value="NU" aria-
label="Nunavut">Nunavut</option><option value="ON" aria-
label="Ontario">Ontario</option><option value="PE" aria-label="Prince Edward
Island">Prince Edward Island</option><option value="QC" aria-
label="Quebec">Quebec</option><option value="SK" aria-
label="Saskatchewan">Saskatchewan</option><option value="YT" aria-
label="Yukon">Yukon</option></select>

<label for="postalCode" class="css-0 evjcd1x0">Postal code</label>
<input type="text" id="postalCode" aria-required="true" required="" data-
automation="postal-code" maxlength="7" class="css-yi67yg eesbt950"
value="M5J2J0">

<label for="phoneNumber" class="css-0 evjcd1x0">Phone</label>
<input type="tel" id="phoneNumber" aria-required="true" required="" data-
automation="phone-number" maxlength="17" class="css-1lo2pik eesbt950"
value="2032223333">

<label for="email" class="css-0 evjcd1x0">Email address</label>
<input type="email" id="email" aria-required="true" required="" data-
automation="email" maxlength="40" class="css-1lo2pik eesbt950"
value="datasaitest2@gmail.com">
```

Card details

Expiry month        Expiry Year        Security code

MM        /        YY

Credit Card Logos

Billing Address

( i )  Your billing information must match what your bank or card issuer has on file.

☑ Same as shipping

```
<label for="cardNumber" class="css-0 evjcd1x0">Card details</label>
<input type="tel" id="cardNumber" aria-required="true" required=""
maxlength="19" class="css-1lo2pik eesbt950" value="">

<label for="expiryMonth" class="css-0 evjcd1x0">Expiry month</label>
<input type="number" placeholder="MM" aria-label="MM" id="expiryMonth"
aria-required="true" class="css-1vg7cr7 eesbt950" required="" minlength="2"
maxlength="2" value="">

<label for="expiryYear" class="css-0 evjcd1x0">Expiry Year</label>
<input type="number" placeholder="YY" aria-label="YY" id="expiryYear"
aria-required="true" class="css-1vg7cr7 eesbt950" required="" minlength="2"
maxlength="2" value="">

<label for="securityCode" class="css-0 evjcd1x0">Security code</label>
<input type="number" required="" id="securityCode" maxlength="3"
class="esjsdlz1 css-f0up1d eesbt950" value="">
```

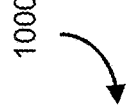

| Field name | Tags | Type |
|---|---|---|
| First Name | input | text |
| Last Name | Input | text |
| Email address | Input | email |
| Phone number | Input | Tel |
| Address line1 | Input | text |
| Address line 2 | Input | Text |
| City | Input | Text |
| Province | Input/select | Text/none while select |
| Country | Sometimes select( doesn't exist all the time) | none |
| Postal code | Input | Text |
| Card number | Input | Text |
| Expiry mm | Input/ select | number |
| Expiry yy | Input/select | number |
| Expiray (mm/yy or mm/yyyy) | Input | Text/ number |
| Cvv | Text | Number |
| Name on card | Input | text |

Figure 11:
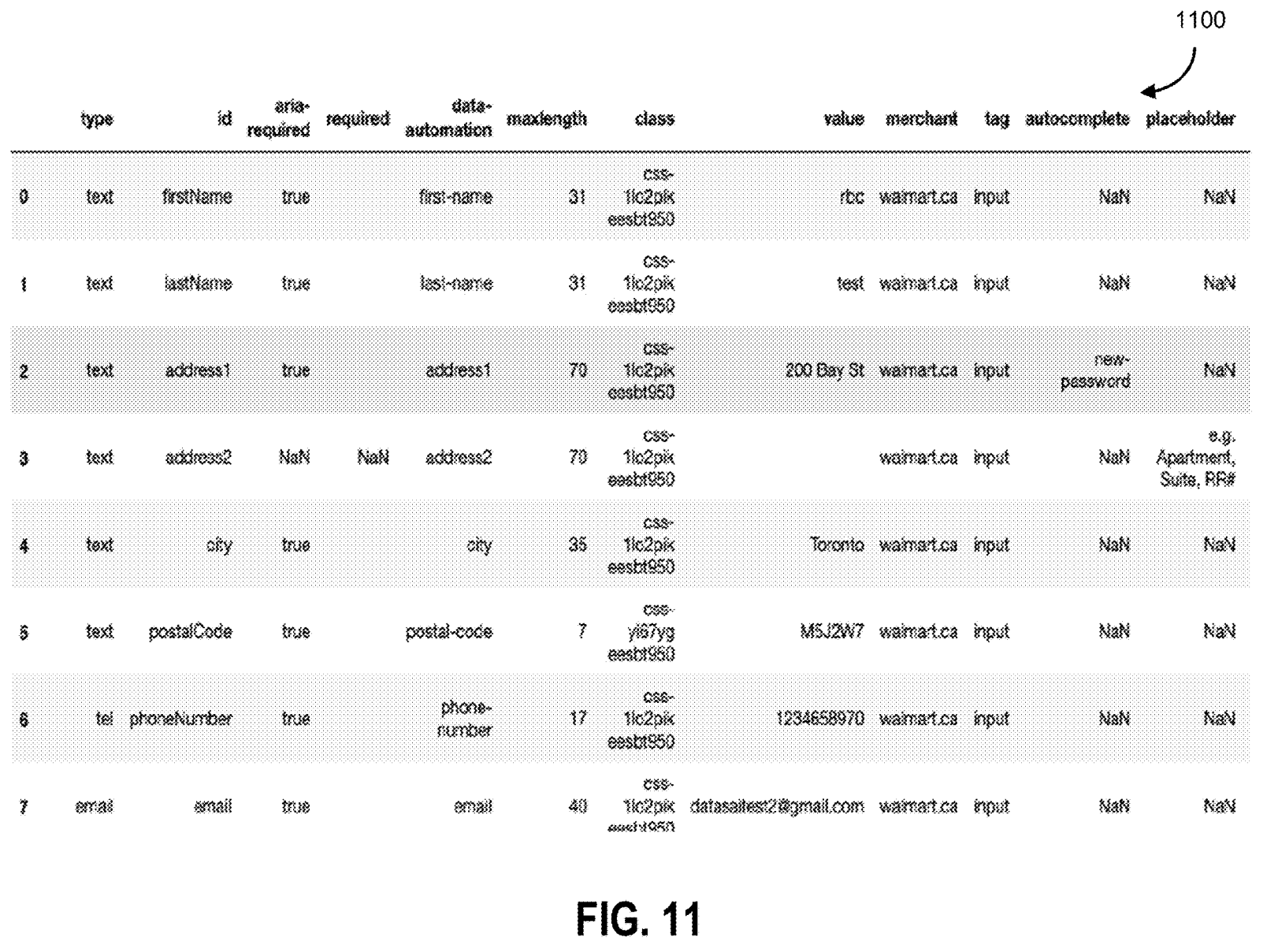

| | type | id | aria-required | required | data-automation | maxlength | class | value | merchant | tag | autocomplete | placeholder |
|---|---|---|---|---|---|---|---|---|---|---|---|---|
| 0 | text | firstName | true | | first-name | 31 | css-1lc2pix eestbt650 | ftc | walmart.ca | input | NaN | NaN |
| 1 | text | lastName | true | | last-name | 31 | css-1lc2pix eestbt650 | text | walmart.ca | input | NaN | NaN |
| 2 | text | address1 | true | | address1 | 70 | css-1lc2pix eestbt650 | 200 Bay St | walmart.ca | input | new-password | NaN |
| 3 | text | address2 | NaN | NaN | address2 | 70 | css-1lc2pix eestbt650 | | walmart.ca | input | NaN | e.g. Apartment, Suite, RR# |
| 4 | text | city | true | | city | 35 | css-1lc2pix eestbt650 | Toronto | walmart.ca | input | NaN | NaN |
| 5 | text | postalCode | true | | postal-code | 7 | css-y87yg eestbt650 | M5J2W7 | walmart.ca | input | NaN | NaN |
| 6 | tel | phoneNumber | true | | phone-number | 17 | css-1lc2pix eestbt650 | 1234658970 | walmart.ca | input | NaN | NaN |
| 7 | email | email | true | | email | 40 | css-1lc2pix eestbt650 | datasalter2@gmail.com | walmart.ca | input | NaN | NaN |

| next_label | previous_label | label_text | for | option | checked | tabindex | aria-label |
|---|---|---|---|---|---|---|---|
| Last Name | start | First Name | firstName | NaN | NaN | NaN | NaN |
| Address line 1 | First Name | Last Name | lastName | NaN | NaN | NaN | NaN |
| Address line 2 | Last Name | Address line 1 | address1 | NaN | NaN | NaN | NaN |
| City | Address line 1 | Address line 2 | address2 | NaN | NaN | NaN | e.g. Apartment, Suite, RR# |
| Province/Territory | Address line 2 | City | city | NaN | NaN | NaN | NaN |
| Phone | Province/Territory | Postal code | postalCode | NaN | NaN | NaN | NaN |
| Email address | Postal code | Phone | phoneNumber | NaN | NaN | NaN | NaN |
| Save this shipping address | Phone | Email address | email | NaN | NaN | NaN | NaN |

| variations in labels | Hand_labels | Tags | Type |
|---|---|---|---|
| first name, given name | First Name | input | text |
| last name, family name | Last Name | input | text |
| name, full name | Full name | input | text |
| email, email address, Email address | Email address | Input | email |
| phone number, phone, contact number, mobile number | Phone number | input | Tel |
| address, addressline1, address line1, street address | Address line1 | Input | text |
| app, suits , floor, apartments, addressline2, address line2 | Address line 2 | Input | Text |
| city, town | City | input | Text |
| province, state, region | Province | input/select | Text/none while select |
| country, region | Country | Sometimes select (doesn't exist all the time) | none |
| postalcode, post code, postal code | Postal code | Input | Text |
| card number, card details | Card number | input | Text |
| expiry mm, month, expiry month, exp mm, etc. | Expiry mm | input/ select | number |
| expiry yy, year, expiry year, expiration year, etc. | Expiry yy | input/select | number |
| expiration, expiry(mm/yy, mm/yy, mmyy etc | Expiry (mm/yy or mm/yyyy) | input | Text/ number |
| cvv, cvd, security code etc. | cvv | Text | Number |
| name on card, card owner, name of the owner etc. | Name on card | input | text |

FIG. 13

Null values:

1400

| columns | Null_values | Action: drop/impute | How imputed |
|---|---|---|---|
| type | yes | drop | . |
| class | yes | keep as it is not part of our training data | . |
| id | yes | drop | . |
| maxlength | yes | impute | * imputed by size column if exists<br>Otherwise<br>** outliers outside interquartile range) were replace by median values in each hard_label_class<br>** missing values will be replaced by the mean of that particular class |
| label_text | yes | impute | * first imput by 'name'<br>* second impute by 'placeholder'<br>* third impute by 'aria-label'<br>* forth impute by 'aria-labelledby'<br>* if still na then identify the key words in id and if keywords exists then impute by id ( two reasons: don't want to loose data, most of the time id will contain label)<br>* if still missing then drop |
| previous_la bel | yes | drop | there were very few |
| next_label | yes | drop | there were very few |

| Row | type | maxlength | next_label_clean | previous_label_clean | label_text_clean | hand_labels |
|---|---|---|---|---|---|---|
| 133 | tel | 19.000000 | exp mm/yy | start | credit card number | card number |
| 135 | tel | 23.000000 | expiration date | name on card | card number | card number |
| 138 | tel | 18.730769 | expiry month | start | card number | card number |
| 140 | tel | 18.730769 | mm/yy | start | card number | card number |
| 146 | tel | 16.000000 | expiration date mmyy | name on card | cardnumber | card number |

| tagName | type | maxlength | label_desc | previous_label | next_label | hand_labels | merchant | filename |
|---|---|---|---|---|---|---|---|---|
| input | text | NaN | security code | start | end | card_cvv | Rise Desk | paymentiframe_cvv.json |
| input | email | NaN | email | start | country region | email_full | Rise Desk | shipping.json |
| select | text | 13.0 | country region | email | first name | address_country | Rise Desk | shipping.json |
| input | text | NaN | first name | country region | last name | name_first | Rise Desk | shipping.json |
| input | text | NaN | last name | first name | address | name_last | Rise Desk | shipping.json |

| 382 | 383 | email | number | tel | text | maxlength | maxlength | select | 384 | 385 | 386 | 387 | 388 | 389 | 390 |
|---|---|---|---|---|---|---|---|---|---|---|---|---|---|---|---|

| Feature | Transformation |
|---|---|
| type | Dummy features were created using one hot encoding |
| label_text | 384 dimensional dense Word embedding using sentence transformer model all-MiniLM-L6-V2 |
| hand_label ( target) | Integer encoding using Label_encoder() |

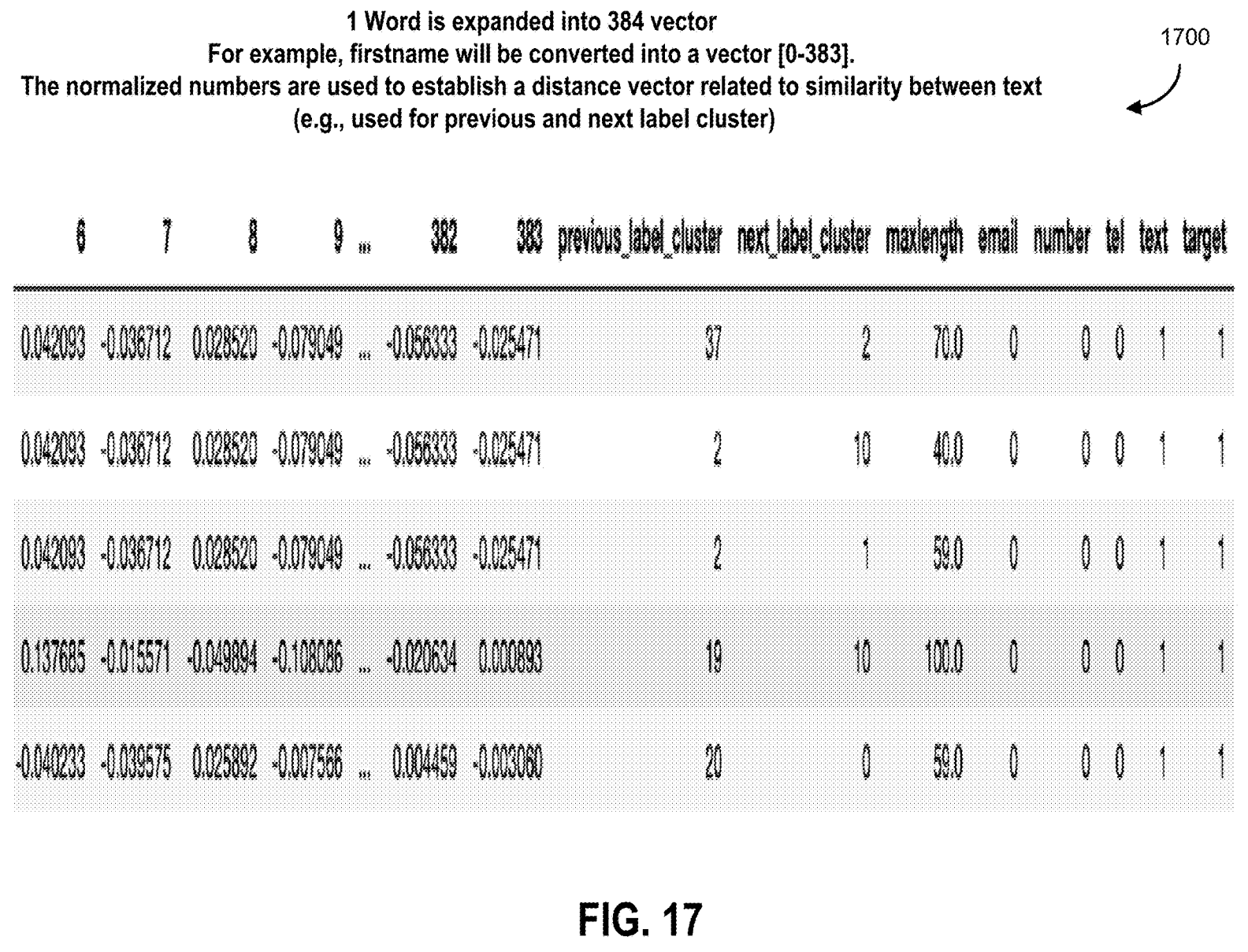

1700

1 Word is expanded into 384 vector

For example, firstname will be converted into a vector [0-383].
The normalized numbers are used to establish a distance vector related to similarity between text
(e.g., used for previous and next label cluster)

| 0 | 7 | 8 | 9 | ... | 382 | 383 | previous_label_cluster | next_label_cluster | maxlength | email | number | tel | text | target |
|---|---|---|---|---|---|---|---|---|---|---|---|---|---|---|
| 0.042083 | -0.038712 | 0.028520 | -0.079049 | ... | -0.068033 | -0.025471 | 37 | 2 | 70.0 | 0 | 0 | 0 | 1 | 1 |
| 0.042083 | -0.038712 | 0.028520 | -0.079049 | ... | -0.068033 | -0.025471 | 2 | 10 | 40.0 | 0 | 0 | 0 | 1 | 1 |
| 0.042083 | -0.038712 | 0.028520 | -0.079049 | ... | -0.068033 | -0.025471 | 2 | 1 | 50.0 | 0 | 0 | 0 | 1 | 1 |
| 0.137085 | -0.015571 | -0.048094 | -0.108086 | ... | -0.026634 | 0.000898 | 19 | 10 | 100.0 | 0 | 0 | 0 | 1 | 1 |
| 0.040233 | -0.038575 | 0.026892 | -0.077556 | ... | 0.004459 | -0.013080 | 20 | 0 | 50.0 | 0 | 0 | 0 | 1 | 1 |

FIG. 17

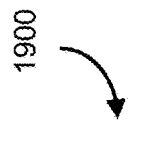

1900

```
XGBClassifier(base_score=0.5, booster='gbtree', callbacks=None,
       colsample_bylevel=1, colsample_bynode=1, colsample_bytree=1,
       early_stopping_rounds=None, enable_categorical=False,
       eval_metric=None, gamma=0, gpu_id=-1, grow_policy='depthwise',
       importance_type=None, interaction_constraints='',
       learning_rate=0.300000012, max_bin=256, max_cat_to_onehot=4,
       max_delta_step=0, max_depth=6, max_leaves=0, min_child_weight=1,
       missing=nan, monotone_constraints='()', n_estimators=100,
       n_jobs=0, num_parallel_tree=1, objective='multi:softprob',
       predictor='auto', random_state=0, reg_alpha=0, ...)
```

Figure 21:
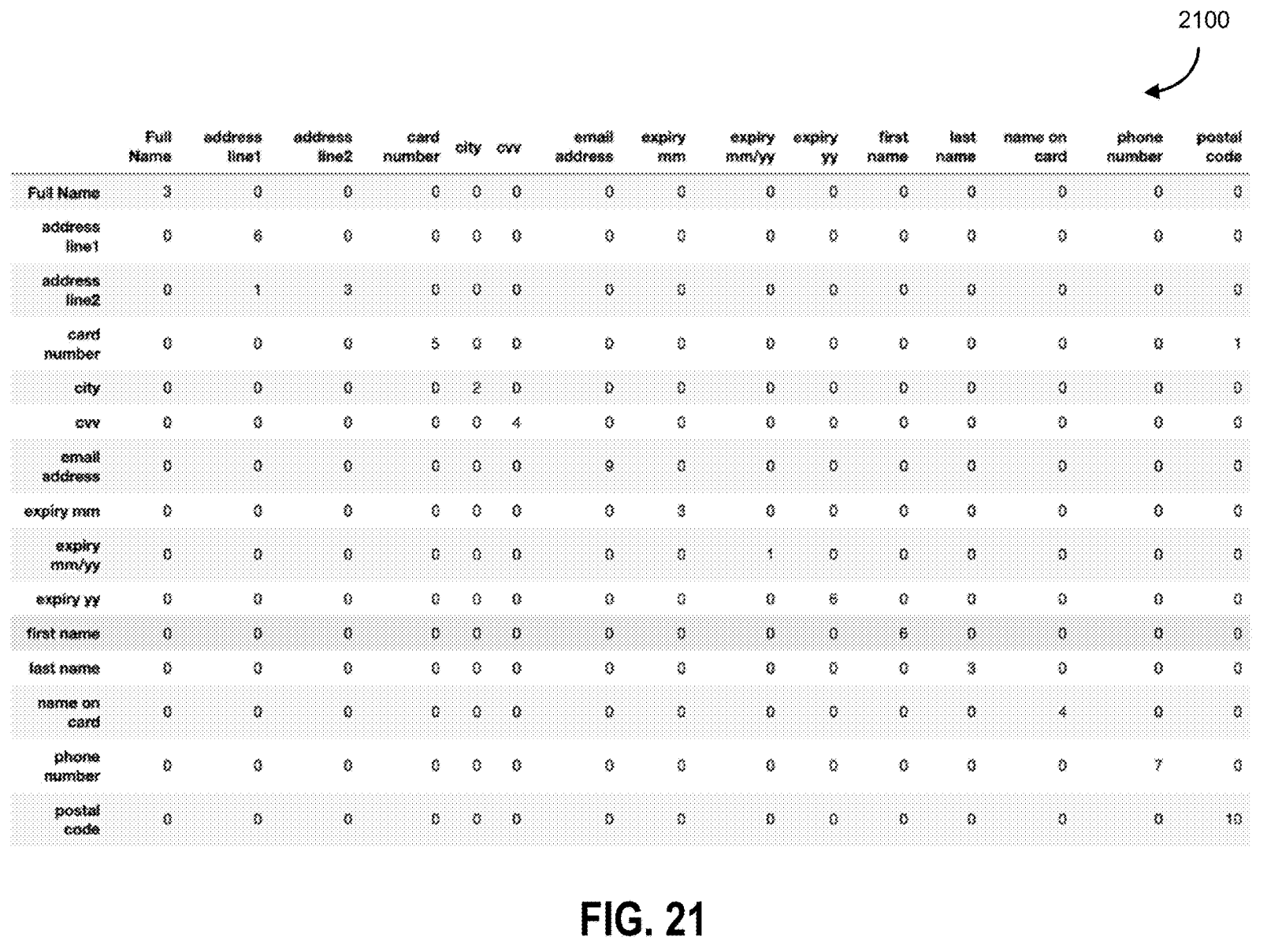

| | Full Name | address line1 | address line2 | card number | city | cvv | email address | expiry mm | expiry mm/yy | expiry yy | first name | last name | name on card | phone number | postal code |
|---|---|---|---|---|---|---|---|---|---|---|---|---|---|---|---|
| Full Name | 3 | 0 | 0 | 0 | 0 | 0 | 0 | 0 | 0 | 0 | 0 | 0 | 0 | 0 | 0 |
| address line1 | 0 | 8 | 0 | 0 | 0 | 0 | 0 | 0 | 0 | 0 | 0 | 0 | 0 | 0 | 0 |
| address line2 | 0 | 1 | 3 | 0 | 0 | 0 | 0 | 0 | 0 | 0 | 0 | 0 | 0 | 0 | 0 |
| card number | 0 | 0 | 0 | 5 | 0 | 0 | 0 | 0 | 0 | 0 | 0 | 0 | 0 | 0 | 1 |
| city | 0 | 0 | 0 | 0 | 2 | 0 | 0 | 0 | 0 | 0 | 0 | 0 | 0 | 0 | 0 |
| cvv | 0 | 0 | 0 | 0 | 0 | 4 | 0 | 0 | 0 | 0 | 0 | 0 | 0 | 0 | 0 |
| email address | 0 | 0 | 0 | 0 | 0 | 0 | 8 | 0 | 0 | 0 | 0 | 0 | 0 | 0 | 0 |
| expiry mm | 0 | 0 | 0 | 0 | 0 | 0 | 0 | 8 | 0 | 0 | 0 | 0 | 0 | 0 | 0 |
| expiry mm/yy | 0 | 0 | 0 | 0 | 0 | 0 | 0 | 0 | 1 | 0 | 0 | 0 | 0 | 0 | 0 |
| expiry yy | 0 | 0 | 0 | 0 | 0 | 0 | 0 | 0 | 0 | 8 | 0 | 0 | 0 | 0 | 0 |
| first name | 0 | 0 | 0 | 0 | 0 | 0 | 0 | 0 | 0 | 0 | 8 | 0 | 0 | 0 | 0 |
| last name | 0 | 0 | 0 | 0 | 0 | 0 | 0 | 0 | 0 | 0 | 0 | 8 | 0 | 0 | 0 |
| name on card | 0 | 0 | 0 | 0 | 0 | 0 | 0 | 0 | 0 | 0 | 0 | 0 | 4 | 0 | 0 |
| phone number | 0 | 0 | 0 | 0 | 0 | 0 | 0 | 0 | 0 | 0 | 0 | 0 | 0 | 7 | 0 |
| postal code | 0 | 0 | 0 | 0 | 0 | 0 | 0 | 0 | 0 | 0 | 0 | 0 | 0 | 0 | 10 |

| | precision | recall | f1-score | support |
|---|---|---|---|---|
| Full Name | 1.00 | 1.00 | 1.00 | 3 |
| address line1 | 0.86 | 1.00 | 0.92 | 6 |
| address line2 | 1.00 | 0.75 | 0.86 | 4 |
| card number | 1.00 | 0.83 | 0.91 | 6 |
| city | 1.00 | 1.00 | 1.00 | 2 |
| cvv | 1.00 | 1.00 | 1.00 | 4 |
| email address | 1.00 | 1.00 | 1.00 | 9 |
| expiry mm | 1.00 | 1.00 | 1.00 | 3 |
| expiry mm/yy | 1.00 | 1.00 | 1.00 | 1 |
| expiry yy | 1.00 | 1.00 | 1.00 | 6 |
| first name | 1.00 | 1.00 | 1.00 | 6 |
| last name | 1.00 | 1.00 | 1.00 | 3 |
| name on card | 1.00 | 1.00 | 1.00 | 4 |
| phone number | 1.00 | 1.00 | 1.00 | 7 |
| postal code | 0.91 | 1.00 | 0.95 | 10 |
| | | | | |
| accuracy | | | 0.97 | 74 |
| macro avg | 0.98 | 0.97 | 0.98 | 74 |
| weighted avg | 0.98 | 0.97 | 0.97 | 74 |

FIG. 22

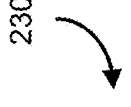
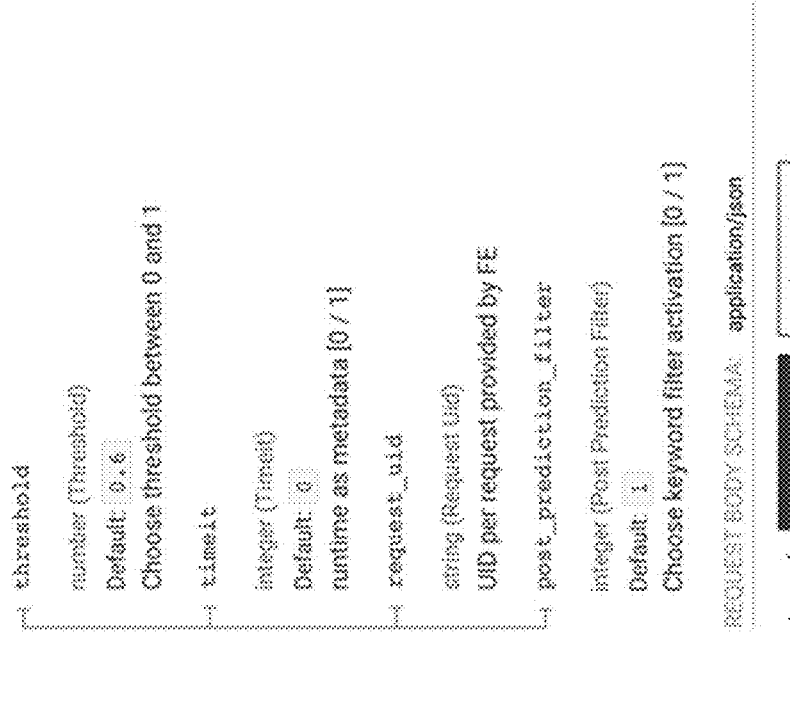
FIG. 23

```
Response body

{
 "prediction": [
  {
   "id": "checkout_email",
   "name": "checkout[email]",
   "class": "field_input",
   "label_desc": "email",
   "prediction": "email_full",
   "prob": "0.99889",
   "autocomplete": "shipping email"
  }
 ],
 "meta": {
  "runtime_seconds": 0.07040704932275,
  "threshold": 0.6,
  "span_id": "EdR7U9SwHoQnir2B3ZAW"
 }
}
```

FIG. 26

```
root
|-- prediction: array
|   |-- element: struct
|   |   |-- id: str
|   |   |-- name: str
|   |   |-- class: str
|   |   |-- label_desc: str
|   |   |-- prediction: str
|   |   |-- prob: str
|   |   |-- optionTag_value: str
|   |   |-- autocomplete: str
|-- meta: dict
|   |-- runtime_seconds: long
|   |-- threshold: float
|   |-- span_id: str
```

3200

SYSTEM AND METHOD FOR MACHINE LEARNING ARCHITECTURE FOR ELECTRONIC FIELD AUTOFILL

CROSS-REFERENCE

This application is a non-provisional of, and claims all benefit, including priority to: U.S. Application No. 63/421,144, entitled SYSTEM AND METHOD FOR MACHINE LEARNING ARCHITECTURE FOR ELECTRONIC FIELD AUTOFILL, filed 31 Oct. 2022. This application is incorporated herein by reference in its entirety.

FIELD

Embodiments of the present disclosure relate to the field of machine learning, and more specifically, embodiments relate to devices, systems and methods for electronic field autofill based using machine learning models.

INTRODUCTION

A challenge with electronic field autofill is that there is significant variability in how webpages or web objects are presented from different sources, such as different vendors, different companies, etc., as there are different coding approaches and architectures that could potentially be used.

It can be difficult to provide a scalable and robust solution that operates sufficiently well in the different types of contextual situations encountered in practical real-world implementation.

SUMMARY

Approaches are proposed herein for machine learning based electronic field autofill. In particular, machine learning approaches are utilized to estimate inputs for entry into fields. The machine learning approach described herein includes a proposed feature engineering approach where collected data obtained from various webpages (e.g., checkout pages) is encoded for training and inference. The machine learning is used for an improved autocomplete mechanism where, for example, a user is able to enable a feature that allows a browser or backend system to predict a value for insertion (either automatically or based on a prompt to the user).

Electronic field autofill is a useful feature to implement in web page/web flow orchestration, as among others, it reduces certain frictions faced by users of webpages or web objects/web interfaces, such as the need to enter redundant information into web object input elements, such as input boxes, forms, radio button lists, among others.

Accordingly, electronic field autofill can be used in situations such as customer shopping journeys where a customer must traverse through a number of different pages relating to different selection/payment/checkout flows, helping the journeys become faster and smoother relative to previous approaches (e.g., manual entry). However, in practical implementation, electronic field autofill yields non-trivial computational and technical challenges.

As described herein, the proposed approach utilizes machine learning computational mechanisms to address technical problems that relate to generating user interface entries automatically based on information extracted from various webforms. In the proposed approach, the approach is used for automatic field label prediction (e.g., in web browsers) where an objective is to predict labels for entry (e.g., filed labels). A challenge is that there is a diversity and inconsistency in how webforms and web pages are programmed, and these inconsistencies can lead to webforms returning errors during autofill. For example, there can be diversity even in encoding, how names are entered, syntax, etc. While for a human it would be straightforward to understand, for a machine, these types of inconsistencies are difficult to address. Accordingly, approaches are proposed that not only can identify what information to enter, but attempts are made to track the specific type of syntax to utilize.

The autofill can also be utilized, for example, for input fields that are not necessarily text driven. For example, there can be support for select/dropdown fields. The approach can be flexibly used to address dropdown fields in checkout flow such as province, country, expiration month and expiration year.

As a practical example, the objective is to identify the fields of the checkout pages for various merchants pages using machine learning to autofill. The use of machine learning architectures aids in providing a flexible approach for addressing problems of variability in how pages are rendered and customized by third parties without having the need to undertake preparing explicit rules for specific website designs. This is particularly important in a retail context as there can be thousands of different site designs, and it would be impractical to prepare explicit rules to cover every case.

As a first step, web page mark up language (e.g., HTML) data is received and parsed, and extracted the features from the code of multiple webforms. Accordingly, the markup language can be converted into a readable (e.g., machine-readable) format for entry.

In some embodiments, instead of a single form, a parsed HTML page could, for example, be a combined JSON data object forms per page instead of one form.

Labels can be provided (e.g., generated or identified) using semantic similarity. A number of different binary classifiers (e.g., one for each label) can be trained, and each of the features can be mapped to a feature vector (e.g., using one-hot encoding to each of the feature and concatenating them). An improved labelling engine is proposed in some variants for improved accuracy.

For the machine learning mechanism, the input features, for example, can include, among others, id, URL, label, name, and pre-processing can be conducted on each feature using stop words. Fields for labels can be semantically similar to the available fields used to generate the labels. Labels can be used for identifying predicted classes, such as name (full, first, last, address sub-fields, phone number, email, card number, card name, card expiry, phone country code, etc.). Each of these predicted classes can be subdivided into specific sub-variations of the predicted classes, such as address_postal, address_province (Ontario), address_province_2 (ON), address_province_3 (ONT), etc. These sub-variations are important because there are situations where there is a validation process instituted to ensure that that the inputs match a specific syntax (e.g., three alphanumeric characters), and if the specific syntax does not match, an error is returned (e.g., please enter three alphanumeric characters for the province or state). This is a technical challenge as websites and fields are not consistently set up—for example, Alaska can be "Alaska", "AK" (USPS abbreviation), "alaska", "US-AK" (ISO 3166), among others.

As noted, if labels exist, then the system is configured to conduct text cleaning, if required, and generates next and previous labels. Then, these labels will be sent for word embedding and followed by using clustering algorithm (in some cases) in case of next and previous label. A clustering approach is not always necessary in all variations. For example, in a variation, machine learning auto-filling approaches can be conducted without generating any clusters, and similarly, in this variation, there does not necessarily need to be imputation of type and maxlength based on clusters.

If labels do not exist, then the system attempts to obtain that information from the input tags, which contains attributes like "name", "placeholder", "aria-labelledby" to get the label of that particular field. In this case, the approach still includes cleaning these attributes before imputing it for the labels. As a practical example, "name" could be "1233456699—addressline1", then the system would need to clean this text before assigning it to the label.

The trained system can be, for example, a multi-class decision forest topology, and in some examples, can reach 95% precision. As noted above, these class predictions are not only for the type of field, but rather, can also include the specific syntactical variation corresponding to the field for entry (so that it does not return an error).

Multi-class classification can utilize different tools, such as logistic, SVM, Keras, among others. Labels can be identified and placed in the form of values into the correct interactive interface objects. Finally, the input autofill can be securely transmitted to the browser (e.g., to fill back the user information in the page).

In some embodiments, the system could also include a subsystem that is a classifier to predict whether or not the current web page is a checkout page, and that can be used to establish domains for whitelist/blacklist to trigger various flows if they are or are not checkout pages.

In a first aspect, a computer implemented system for machine learning architecture for electronic field autofill is proposed, the system including a processor operating in conjunction with computer memory and non-transitory computer readable storage. The processor is configured to extract raw input data sets from one or more webpages, the raw input data sets representing raw markup language machine instructions used in rendering the one or more webpages, identify one or more input fields in the raw input data sets, and for each input data field, extract label information, extend the label information using feature engineering approaches including at least word embedding of label text and clustering approaches to associate each label with at least a cluster type encoding, and train a machine learning model architecture using the extended label information to establish a trained machine learning model architecture.

After the training is complete, the system can then conduct inference, the system configured to receive a new webpage having at least one input data field for inference; and, for the at least one input data field, process the new webpage and associated markup language using the trained machine learning model architecture to identify a predicted label, and based on the predicted label, conduct an electronic field autofill of the at least one input data field.

The extracted label information may include at least one of a maxlength of the input field.

In some embodiments, the cluster type encoding includes at least a cluster type encoding for the label, a previous cluster label, or a next cluster label.

In some embodiments, the feature engineering approaches include processing the raw input data sets using a sentence transformer model to conduct a mapping to a dense vector.

In some embodiments, the dense vector is utilized to determine the cluster type encoding.

In some embodiments, determining the cluster type encoding utilizes one-hot encoding.

In some embodiments, the extended label information is represented as a concatenated data frame.

In some embodiments, the machine learning model architecture is an XGBoost classification model, and the machine learning model architecture is trained until at least a threshold accuracy level is reached.

In some embodiments, the machine learning model architecture generates logit values representing predictions of labels for each of the at least one input data field, and a highest logit value is used to determine what information is used for the electronic field autofill.

In some embodiments, the machine learning model architecture resides on a backend server and copies of the trained machine learning model architecture are deployed to reside on local memory on user devices for conducting electronic field autofill.

There are three steps to using the system, and these include model training, storing the trained models, and real time inference. In model training/development, data is collected or other samples are obtained and used for tuning the mode. As part of this phase, the Select tag is added and the model is trained. Approaches may be utilized to coordinate field extraction from different types of input fields, such as drop down selections, including province, expiry MM, expiry YY, country, among others. Select fields can be solved in different ways, such as using the same model and adding more data, or training a new model by utilizing additional features, such as the size of the values, a count of the options, etc.

The model may be utilized during inference time in a model serving approach, where: user consent can first be validated where the user will have to approve of the checkout page autofill and personal data retrieval. This can be done, for example, through a pop-up to be surfaced once the user is on a classified merchant checkout page. In alternative approaches, the user may have already approved through a updated user agreement T&Cs (Terms and Conditions), or other explicit user approvals to be obtained through one time or periodic communication.

The HTML form is fetched, for example, by an intermediary data process, and embedded code allows for the web page source code extraction. The code is extracted and prepared, and feature engineering steps as described herein can be used whereby embedded (and) or backend services (including cloud) parse and transform/or the extracted html source code into features the model had been trained on and the steps can match to the data prep and feature engineering steps used during model training. The HTML code is used to extract information out of certain tags. These tags are input tags, select tags, and label tags. These are used to create a consolidated data object (JSON data object, for example). All of the tags for a particular merchant can be combined together to form the final dataframe for further analysis. If labels are not present, a computation can be conducted based on other keys in input attributes to generate labels.

Predictions are generated by loading the classification model, input feature vector, and predicted labels. The model can be embedded on an edge device or to run on remote services. Feature engineering steps are utilized to provide additional information for prediction. These include generating additional previous label and next labels that can be used as inputs for the machine learning engine. A tuned XGBoost model was proposed herein but other models are possible.

Match user information using predicted labels is conducted once the labels are predicted. The labels are matched to user specific data (e.g., address: 181 Bay St). This key value results to most likely be produced through backend services for additional validations, however other options are currently being considered to also obtain that sensitive data from edge device tokenized keys and banking apps.

Once the user's personal information is obtained, it will be embedded back into the active session page source code through generated code, or HTML code used to fill in various fields, with the html field locator (id/name, etc.) and corresponding user information (name, email, phone number etc.). The code can, for example, be embedded on an edge device. In some embodiments, in order to reduce latencies, preserve privacy, and to allow for mostly offline capabilities, embedded solutions can be utilized to autofill ML.

Applicants conducted a number of experiments and were able to achieve satisfactory performance in respect of autofilling fields with a reasonable level of accuracy.

Accordingly, an improved technical approach is proposed that yields a webform variance resilient approach for autofilling form fields using machine learning approaches for field type and field syntax classification. Once a correct field and syntax is identified, correct user information can be inserted into that field.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 1B is a method diagram showing steps of an example data process for conducting the approach of FIG. 1A, according to some embodiments.

FIG. 5 shows an example set of parsed input tags.

FIG. 7A, FIG. 7B, FIG. 8, and FIG. 9 are examples from a checkout simulation.

FIG. 10 shows an example set of field names, tags, and type.

FIG. 11 and FIG. 12 depict a merged screenshot of a same data frame.

FIG. 13 is an example set of hand labels.

FIG. 14 is a set of cleaned data labels in this example.

FIG. 15A and FIG. 15B are two example sets of selected features. FIG. 15C shows an example data frame.

FIG. 17 shows an example set of normalized data.

FIG. 19 shows pseudocode for showing the base model, according to some embodiments.

FIG. 21 is a confusion matrix showing example results.

FIG. 22 is an example classification report.

FIG. 23 is an example set of query parameters for an application programming interface, according to some embodiments.

FIG. 24 is an example user interface screen configured for receiving a set of query parameters for an application programming interface, according to some embodiments.

FIG. 26 is an example set of responses, according to some embodiments.

DETAILED DESCRIPTION

As described herein, autofill is a useful technical feature that is utilized as a technical solution to aid in improving a customer shopping journey by enabling automatic fill in of input fields such that the journey and experience for the user can be fast and smooth.

However, there are a number of different approaches that can be used for implementing webpages, and merchants and other sites do not necessarily adhere to a consistent set of requests. For example, different semantic words can be utilized for a same request, and it may be difficult and infeasible to design a set of rigid logical rules to handle every possible situation and variation.

Accordingly, an approach is proposed which collecting the checkout page forms and corresponding information from forms such as shipping address, contact info, and payment info forms and predicting the labels of each of the input fields in the form. In a practical implementation of a first embodiment, the approach yielded results where the input fields with text types were predicted with high accuracy and f1-score. Accordingly, the system is useful for automatically conducting autofill in certain situations. An updated approach is proposed with support for select/dropdown fields. The approach can cover dropdown fields in checkout flow such as province, country, expiration month and expiration year, for example.

A label generation approach is proposed for improved accuracy based on a parsing of a web page (e.g., an HTML page) that is a combined data object (e.g., a combined JSON data object) of forms per page instead of a single form.

Figure 1A:
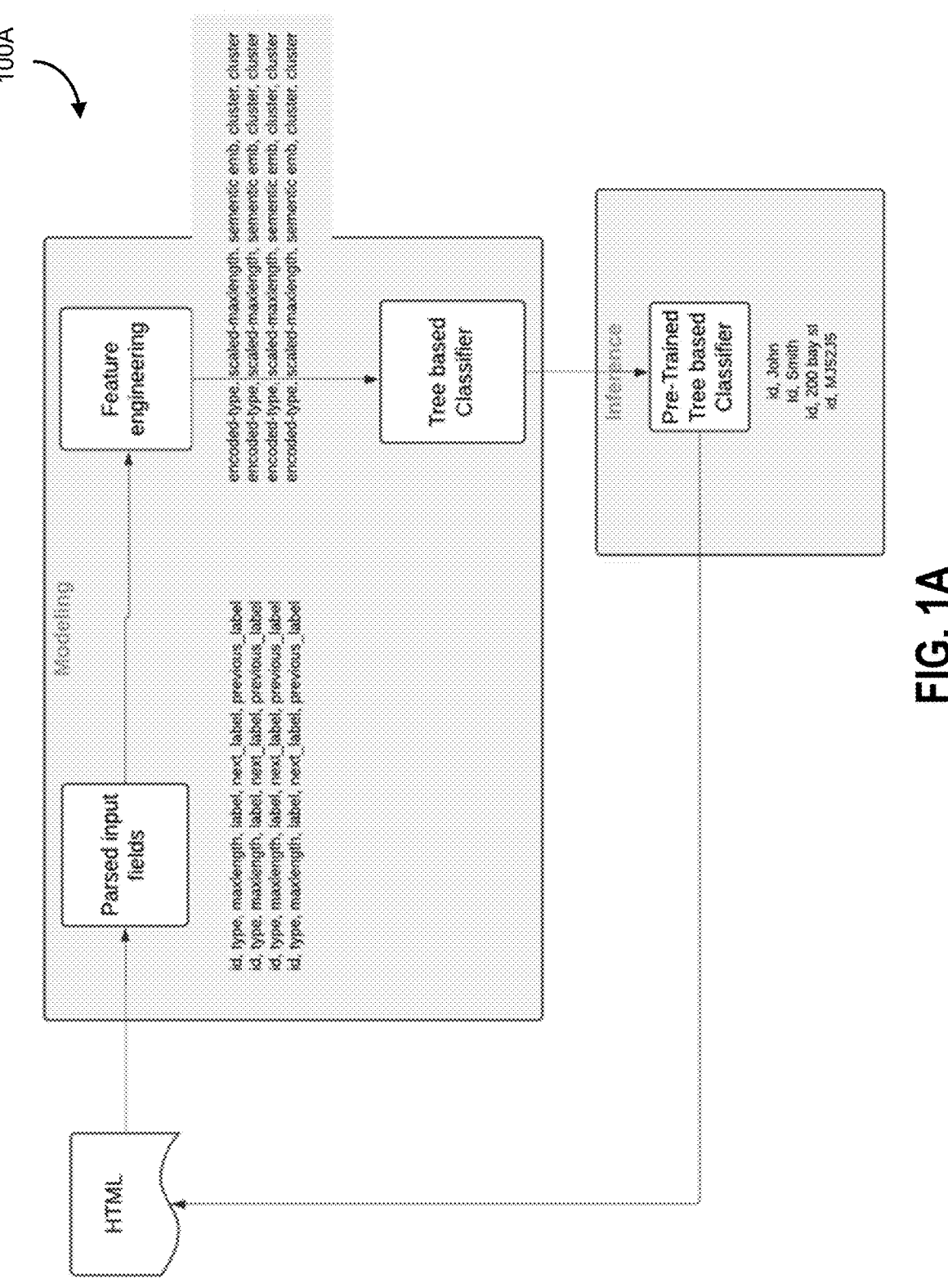
FIG. 1A is a sequence diagram showing example steps of an approach, according to some embodiments.

FIG. 1A is a sequence diagram showing example steps of an approach, according to some embodiments. In diagram 100A, HTML is parsed to extract input fields, and that is used for conducting feature engineering.

The features are then provided to a tree-based classifier. The tree-based classifier can be trained to achieve a particular level of accuracy. While a tree-based classifier is described herein, but this can also be achieved by other types of classifiers. A supervised approach can be used where one can collected data and then hand label each of them based on available user information schema, which help to fill back the form with user information. Different amounts of training and test data can be used (e.g., training data 90% and 10% testing data), and in some embodiments, the system can be configured to use repeated stratified K-fold approaches for training where, for example, the system can take 10 folds and train on 9 folds and test it on the remaining one, which was again repeated 5 times to get the better metric of accuracy.

A trained tree-based classifier can be used during inference to receive a set of inputs, which are then used to automatically generate an output data set for autofill (e.g., the predictive outputs of the model can be utilized.

FIG. 1B is a method diagram showing steps of an example data process for conducting the approach of FIG. 1A, according to some embodiments. In method diagram 100B, webpage markup code pages are parsed to extract attribute tags at 102, and the data set is transformed to generate initial model inputs at 104.

Data preparation steps can include the following steps:
Step 1: Prediction can be Done on Input Fields, or on Dropdown Fields/Select Tags.

This involves separating the input-select tag fields from the label tag fields. Select tags are included in the input dataframe.

Step 2: Type Handling

For input tag fields, if the type is available, it is used as is. Otherwise, it remains null with no imputation.

For select tag fields, if type information is available, it is retained. Otherwise, it is generated based on the inner text of the select fields, which is determined as either a number or text.

Step 3: Maxlength

For input tag fields, if maxlength is present, it is retained. Otherwise the system will attempt to impute using size. if size does not exist then the system will keep it as null.

For select tag fields, if maxlength is not available, it is generated based on the inner text of the select fields, essentially deriving it from the available option text.

In some examples, maxlength is capped at 100.

Step 4: Text Cleaning

Text in fields such as 'id', 'name', 'autocomplete', 'aria-label', 'placeholder', 'aria-labelledby', and 'select_text' (if it contains only text) can be configured to undergo cleaning using regex operations and stopwords. These fields will be used to generate the labels or impute the labels if needed.

Step 5: Label Handling (Updated)

Prospect labels for the input and select are generated using fuzzy matching of the labels created in Step 5 with the prediction classes [appendix, 1]. The label with the highest matching score (cleaned_step5) is selected.

Generate-Labels:
   a. If label tags are present with 'for': Labels from Step 1 are merged with input and select tag fields based on ('for', 'id') or ('for', 'name'). 'for' refers to the attribute in label tags, while 'id' and 'name' are the attributes derived from input/select tags.
   b. In cases where 'for' is not present, or to impute label values, prospect labels from step 1 are utilized.

After model inputs are prepared, feature engineering occurs at steps 106-110, whereby a sentence transformer model is used to conduct a mapping to a dense vector at 106, and for each feature, an appropriate cluster number is identified at 108.

Not all variations require clustering approaches, and accordingly, not all variations need to impute type and maxlength based on clusters.

In a first approach, the approach includes feature engineering the following:
   Columns for type: 'email', 'text', 'number', 'tel'
   Maxlength: 384-dimensional vector generated from the sbert all-MiniLM-L6-V2 model.
   Cluster numbers for previous and next labels (generated using K means)
   Input Dimensionality: 391-dimensional vector In a variant second approach, the following features were engineered:
   Columns for type: 'email', 'text', 'number', 'tel'
   Maxlength: 384-dimensional vector generated from label_ desc using sbert all-MiniLM-L6-V2 transformer-based Sbert model.
   Dummy column indicating whether a given field is select or not.
   384-dimensional vector generated from the previous label of the field using all-MiniLM-L6-V2 transformer-based Sbert model (label_embedding).
   384-dimensional vector generated from the next label of the field using all-MiniLM-L6-V2 transformer-based Sbert model (label_embedding).
   Updated Version Input Dimensionality: 1158-dimensional vector At 108, the step relates to converting next-label and previous label to cluster numbers. At 110, the text is replaced with the associated cluster number 110 and used for generating the predictive output for machine learning autofill.

The sentence transformer model creates a word embedding of the features such as: "Label", "Next Label", "Previous Label" after preprocessing them (imputing null values, some text cleaning). A HTML page will be parsed first and used to generate two tables, one for the Label tag and one for the input tag, and then both of them will be concatenated/merged to form a row dataframe. of the filtered features such as: "type", "maxlength", "label", "next_label", "previous label".

The main reason to add sentence-transformers is that each label is not just a word like "name". Most of the time, more than one word and sometimes an instructional sentence when labels are generated/imputed, for example: "enter your city or postal code".

The system is configured to attempt to embed a text to number, but one cannot create a vector with all the words in the dictionary (bag of words) and then mark it as 1 if word is present and 0 if not, as an impractical sparse matrix would be result having storage issue and computation time complexity. Hence, it is always desired to have a dense vector representation without losing the main crux of the word/sentence (transformer based model are very good at this).

For the next_label_cluster and previous_label_cluster, if one were to just add word-embedding for this two features, then it will be computationally complex as it will be adding nearly 800 more features. The purpose of adding next_label and previous_label is to help the model to see some patterns that some labels are always followed by some particular kind of labels. For example address line2 will always follows address line1. Also, First name/Last name will be the first input field in the address form, etc.

The approach is directed using a model that can not only observe that some label is present before and after, but also which label it can be.

Hence, after creating a word-embedding of next_label and previous_label, the system can be configured to conduct a k-means cluster analysis for each of them and find clusters for each of the possibilities. for example: for previous_label, "start" will be cluster 0 (say). But, "end" won't be there in previous_label at all and vice versa. Furthermore, if label is address line 2 then it will be mostly associated with 4 as the previous_label_cluster (assuming address line 1 is cluster 4).

Figure 2A:
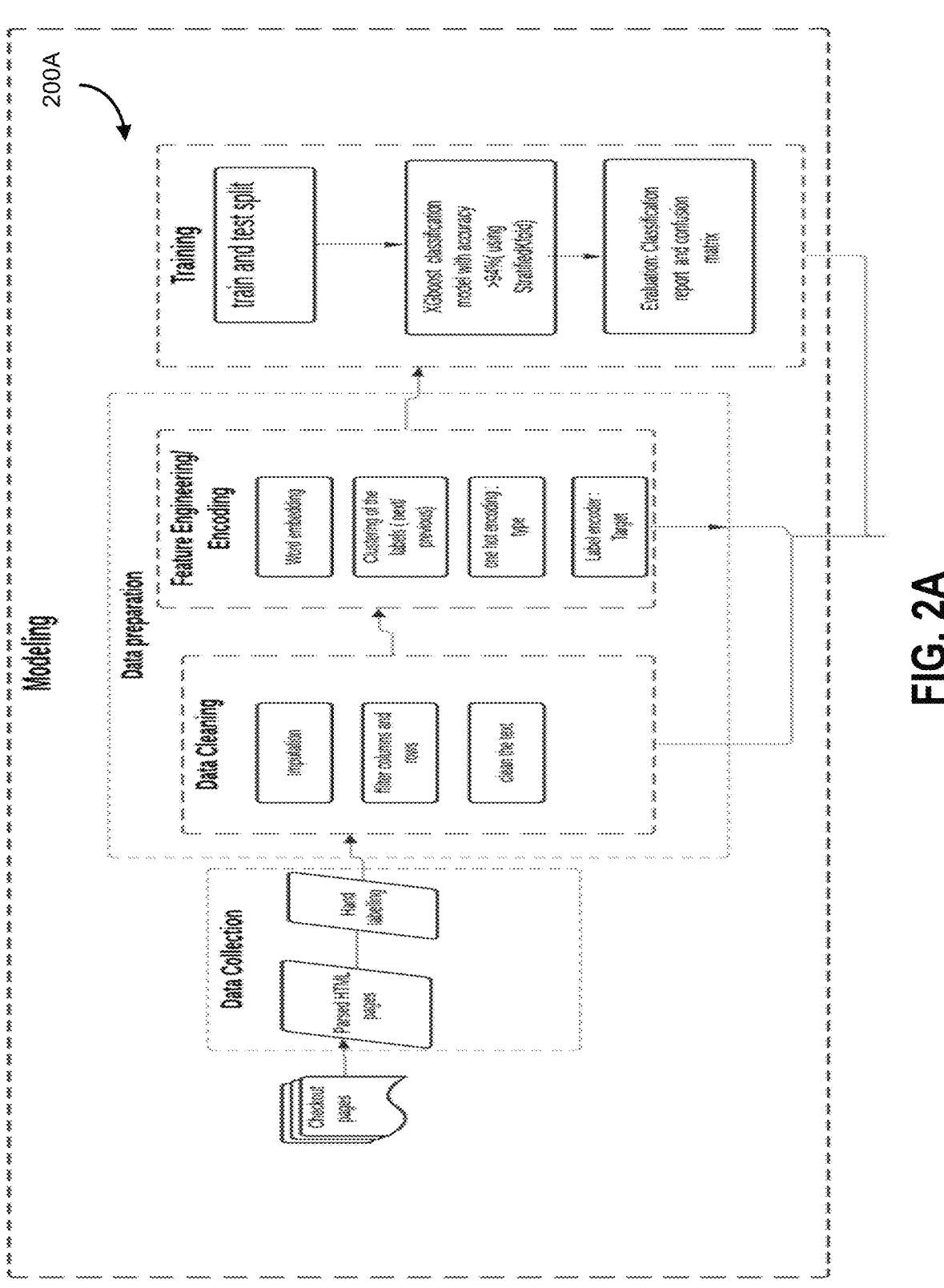
FIG. 2A and FIG. 2B together illustrate an example block diagram of a system implementation, according to some embodiments.
Figure 2B:
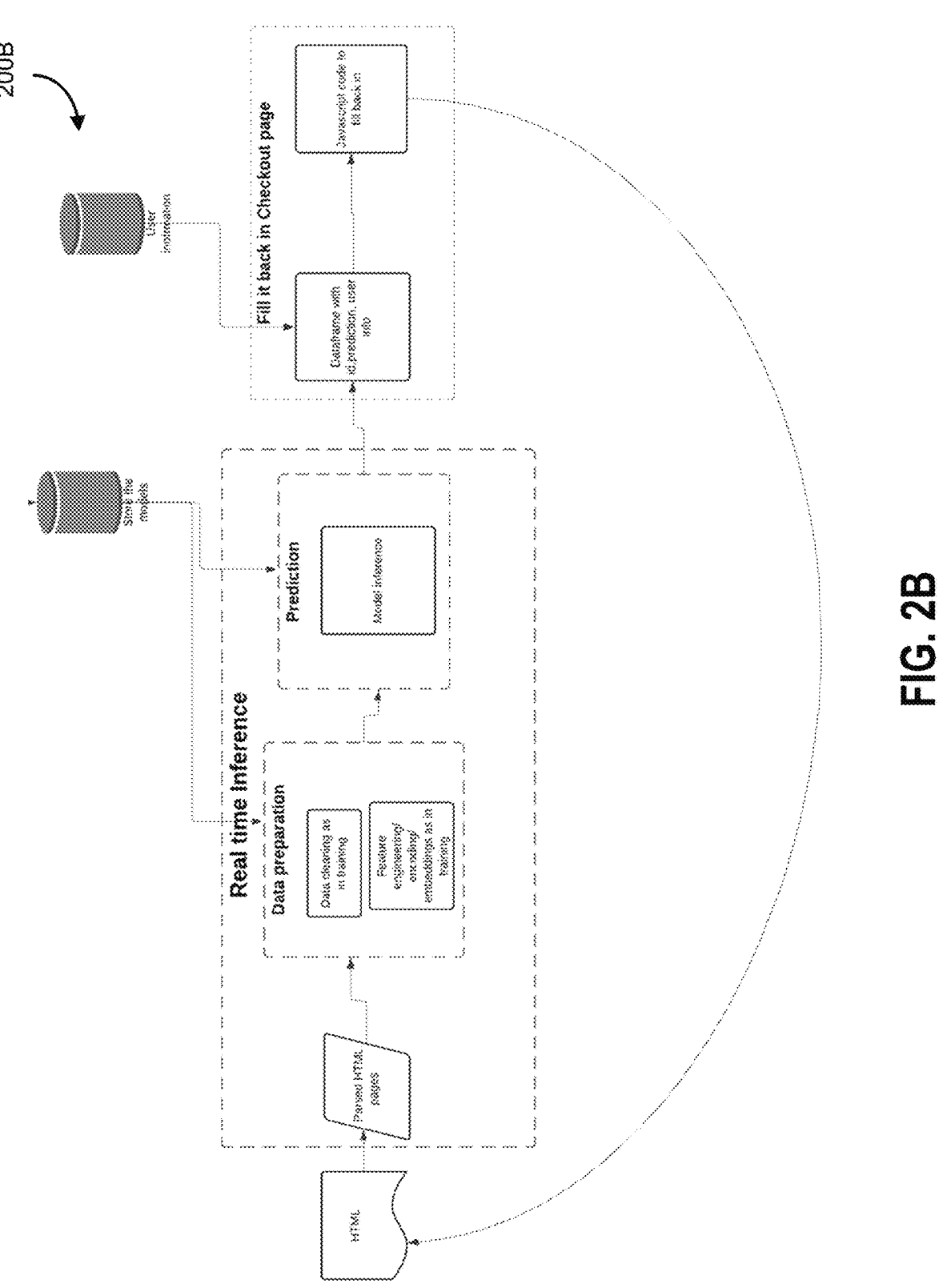

FIG. 2A and FIG. 2B together illustrate an example block diagram of a system implementation, according to some embodiments. As shown in FIG. 2A at 200A, the initial data is collected, prepared, and used for training. In this example, the training utilizes XGBoost as a practical implementation example but not all embodiments are thus limited. In FIG. 2B, at 200B, the system inputs can be used for real-time inference, and used to autofill a particular input field in a checkout page.

Figure 3A:
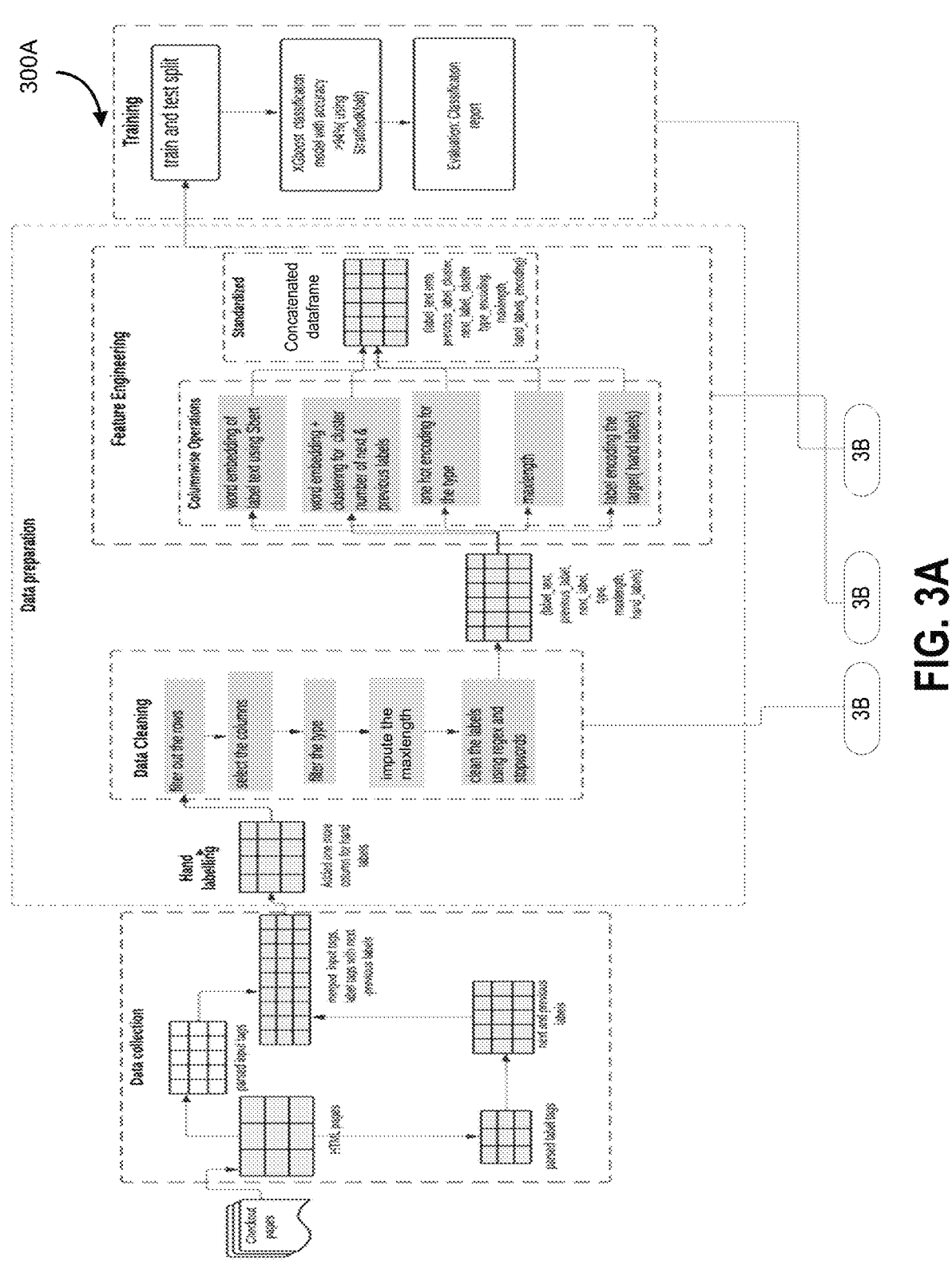
FIG. 3A, FIG. 3B, and FIG. 3C together show a more detailed technical diagram showing intermediate steps for conducting the aspects of FIG. 1A and FIG. 2B, according to some embodiments.
Figure 3B:
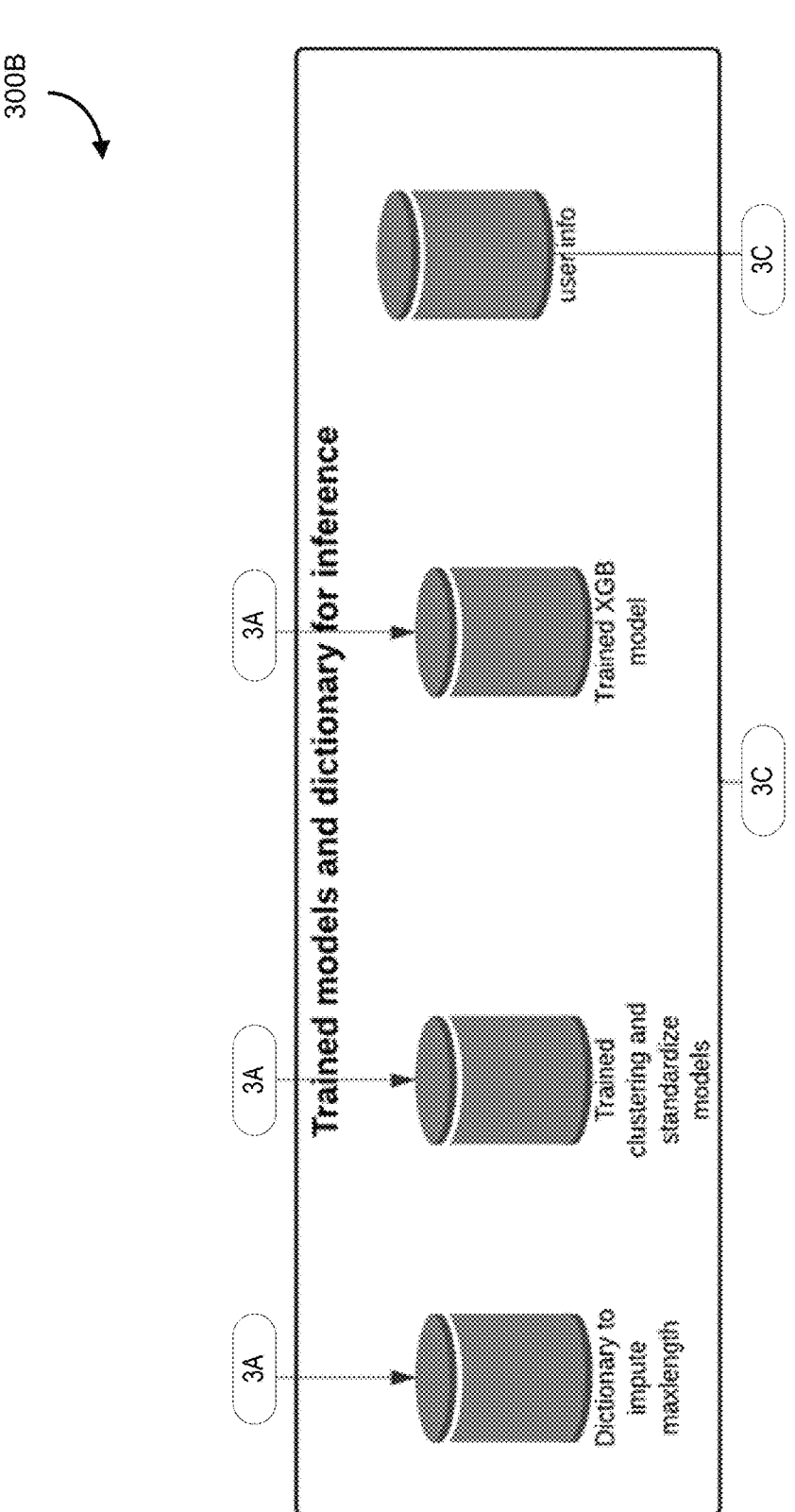
Figure 3C:
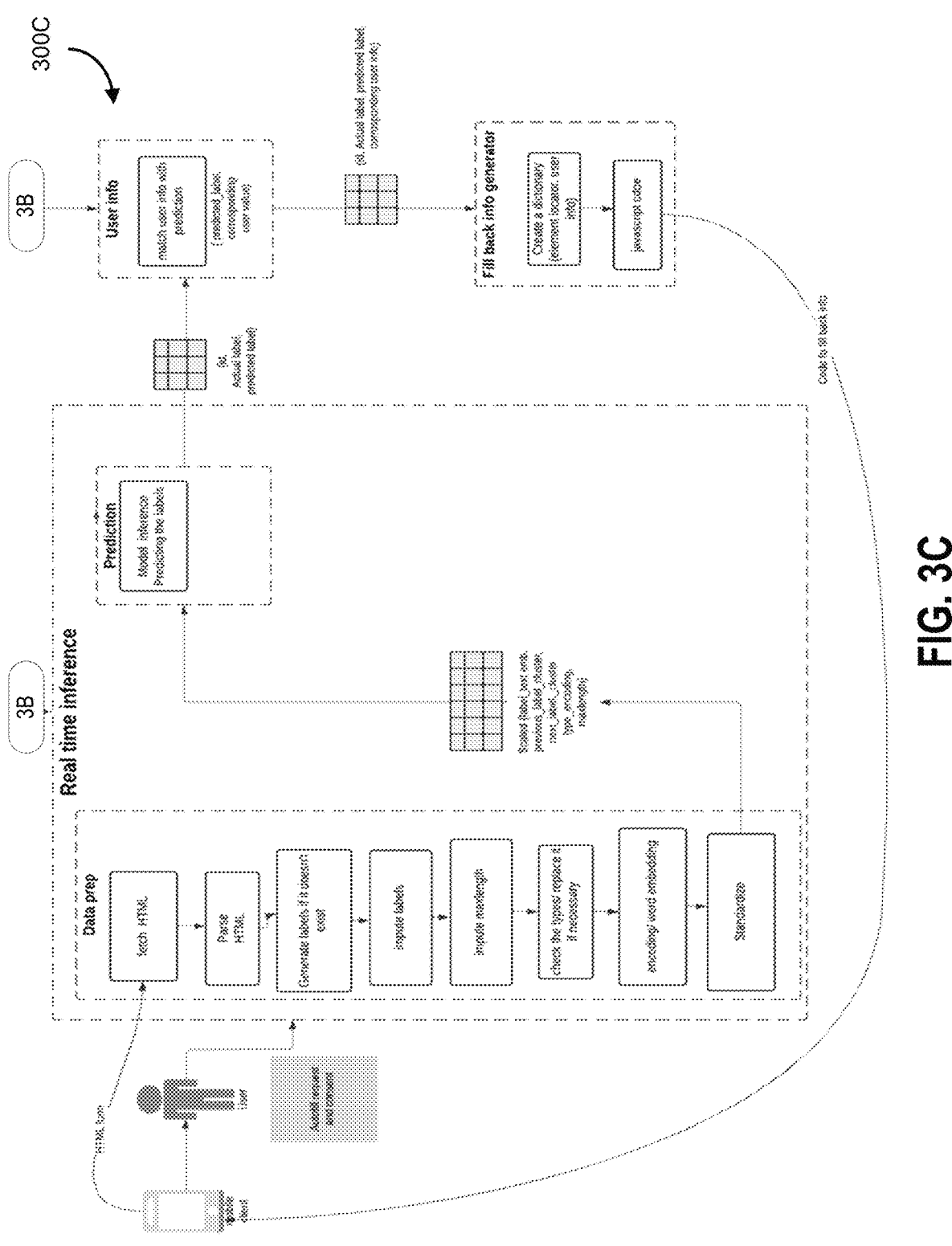

FIG. 3A, FIG. 3B, and FIG. 3C together show a more detailed technical diagram showing intermediate steps for conducting the aspects of FIG. 1A and FIG. 2B, according to some embodiments.

As shown in FIG. 3A-3C, the detailed design above is mainly divided into three components:

Training;

Data cleaning: In this process the approach is adapted to try to remove the unnecessary data and to cleanse data to be used to avoid null values. The approach can include filtering the row which were marked as drop in hand labeling.

Many columns will be generated while collecting parsed input-tag which might not be required for model training and will be dropped. For example, "data-automation", "value", etc. Keep type="text", "email", "number", "tel" and filter out other types such as "select", "radio", "checkbox". During data collection, for example it could occur that the approach didn't get enough data for select tags. so a model might not be not trained on select tag which also have attribute type='select'.

if maxlength doesn't exist, then, in some embodiments, it can be imputed in the following steps: cluster each hand label, replace outlier maxlength by median value, impute the null maxlength by the mean values, and then clean label_text, next_label, and previous_label using stopwords and regex.

At the end of data cleaning, one can will obtain a clean dataframe as follows:

| | type | maxlength | next_label_clean | previous_label_clean | label_text_clean | hand_labels |
|---|---|---|---|---|---|---|
| 133 | tel | 19.000000 | exp mm/yy | start | credit card number | card number |
| 135 | tel | 23.000000 | expiration date | name on card | card number | card number |
| 138 | tel | 18.730769 | expiry month | start | card number | card number |
| 140 | tel | 18.730769 | mm/yy | start | card number | card number |
| 146 | tel | 16.000000 | expiration date mmyy | name on card | cardnumber | card number |

Saving trained model for inference; and

Real time inference

Training is shown at FIG. 3A, showing three main steps: (1) data collection, (2) data preparation, and (3) training. For collection, around 100 merchants' checkout forms (HTML) were collected manually for the training of the model.

Parsing each of the HTML form: Each form contains mainly two tags: input tags and label tags. These tags were parsed separately as shown (parsed input tags and label tags). For label tags, if label are present, the next and previous labels will be generated. Then both the input-tag table and updated will be merged on two keys (for' from label-tag and 'id' from input-tag).

There are various cases here depending on labels:

Case 1: If all labels exist for the input fields then data flows as discussed above are utilized.

Case 2: If some of the labels exists then parsed-input tag table is merged first with parsed label-tag table before creating next and previous label, as the objective is to use the attributes of the input-tags to impute the value for the label.

Case 3: if none of the label are present, then in the above diagram, the updated tag table doesn't exist. In this case, the system uses the parsed-input tag table to generated label first from the attributes like "name"/"placeholder"/"aria-labelledby"/"id" followed by creating next and previous labels.

This process gives the system the raw data to work with which needs further data cleaning.

Data preparation can include hand labelling raw data, as reference to one of the labels that are used for a retailer. For example: "address line1" "address line 1", "street address", "line 1", etc. will be labelled as "address line1". During this process, the approach can also include marking the non-useful data as drop so it will be filtered out.

At FIG. 3B, the models are saved and prepared for inference. Trained models are used for inference, and there can be one or more trained models for feature engineering such as, kmeans for next label and kmeans for previous label, sbert for labels, label-encoder to get the predicted labels (inverse transform).

To impute the max length during inference a dictionary of {labels_cluster_number: mean maxlength}, based on training labels, the approach can include:

Word embedding of all the labels using Sbert model

Find the clusters for labels using kmeans

Create a dictionary of these clusters and their mean maxlength based on training data and classification model for prediction.

Furthermore, the system can be configured to have access to the database from where it can get the user information to fill back in during real time inference.

FIG. 3C shows an approach for real-time inference. Real time inference can be done in 5 steps:

User consent

Data prep

Prediction

User info

Fill back info

Step 1: User Consent: Once it is Identified that it is Checkout Page, User Will be Getting a Consent Request if they Agree then Html Form Will be Collected:

Step 2: Data Preparation

For any form, the system parses the input-tag and label-tag separately. If all labels are present no label generation is not required. Next and previous labels will be generated. Both parsed input tag and label-tag tables will be merged.

If label is not present, then the system will merge the parsed input-tag and parsed label_tag first. Impute the values for label and then create next and previous label for each input fields. This takes care of all the labels.

To impute the maxlength of a input-field, first, the system needs to semantically match the label of the input-field to one of the label in the training data. In some embodiments, instead of matching with some exact label, the approach includes attempting to create a cluster of labels in the training data, and to find out in which cluster the current input-field's label belongs to.

Once the system has found the cluster number for the current input-field's label then the system takes the mean maxlength of that cluster to impute the maxlength of current input-field's maxlength. For example, in most of the cases, phone numbers are under the type="tel", but during testing, Applicants have seen that phone number were under type="phone number" (which is not so frequent). Accordingly, the approach will replace the type by existing types if needed. In all of the above steps, the approach tried to take care of missing features, next encoding each one of them as was conducted in the training using the saved models.

A number of approaches are descried below to obtain specific features:

Labels-Transformer based word embedding can be used to capture semantic meaning of various labels Next_label_cluster: Sbert word embedding followed by Kmeans to generate cluster of semantically similar labels into one cluster. Replace each of the next labels by its cluster number.

Previous_label_cluster: Sbert word embedding followed by Kmeans to generate cluster of semantically similar labels into one cluster. Replace each of the previous labels by its cluster number.

Type-one hot encoding as it is a categorical variable

Maxlength is a numerical variable.

The data can then be standardized to bring it to one scale.

Step 3: Prediction

The saved trained classification model can be used to predict the each of the labels in the form.

Step 4: user info

Each prediction will then be matched with user info. For example, if predicted label is "first name" then user's first name will be added in the last column.

Step 5: Auto fill back in (e.g., using Java code)

Either based on id or name, user values can be filled back in the form accurately.

Figure 4:
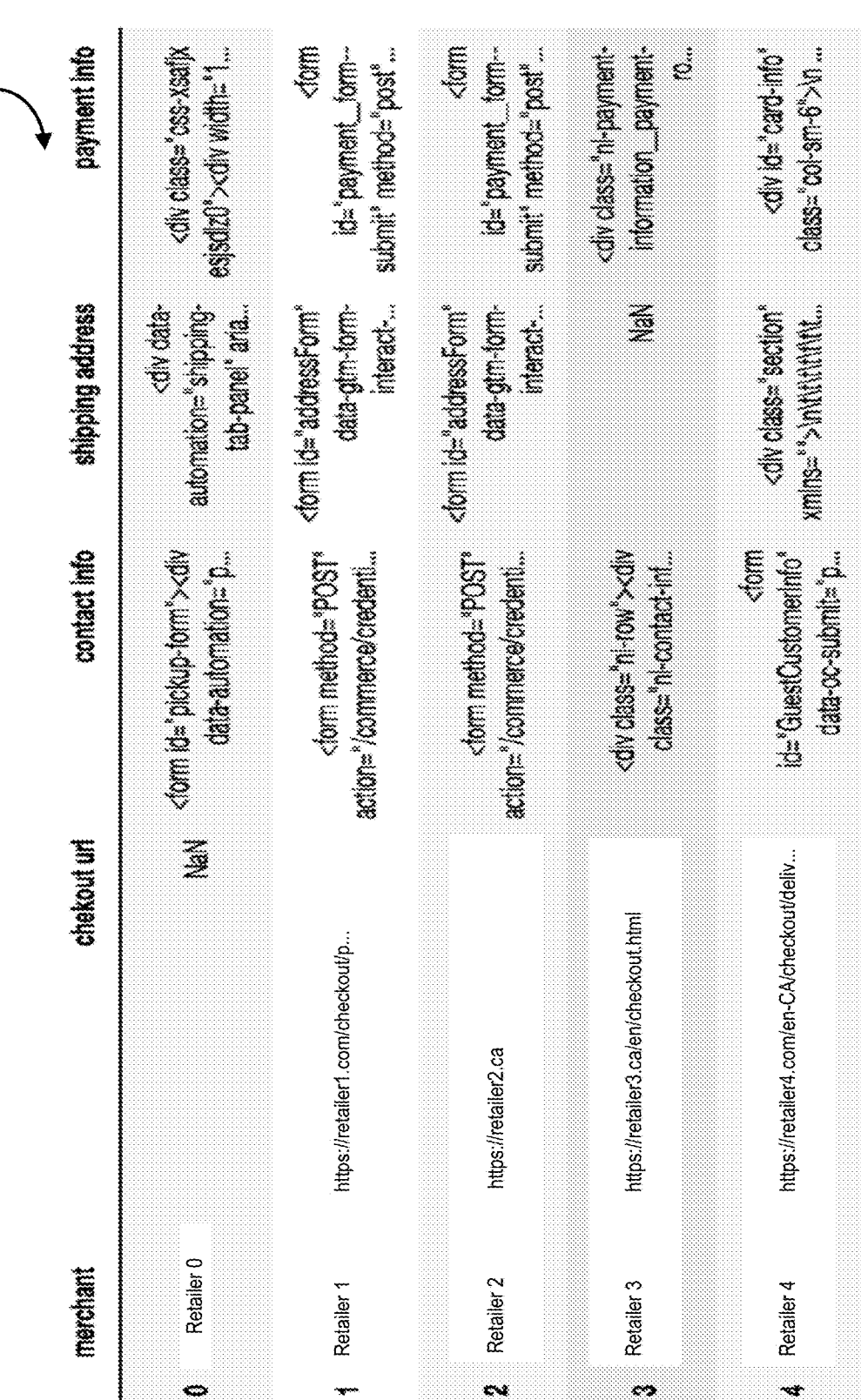
FIG. 4 is an example table of data that was collected.

FIG. 4 is an example table of data that was collected.

In FIG. 4 at 400, data was collected from the html pages of various merchants' checkout sessions. Each checkout session ranges from one page to three pages containing fields for contact info, shipping, and payment on the one or more pages. As shown in above table. html code for contact, shipping, and payment were collected manually saved in a data frame.

In each of the html code, there will be three tags of which the data was segmented into:

1) input tag
2) label tag
3) select tag

Parsing functions can be used for each tag.

Input/Select tags can consist of two types of attributes: (1) to describe the field for user input/selection: type, place holder, name, maxlength etc. and (2) to identify the fields: id (unique), class (not necessarily unique).

Note: In most of the cases, the Select tag will not have type and maxlength attributes but will have options with various values and selection options, for example Value="ON", for option "Ontario" which were captured during the data collection for future use.

A library can be used to parse the HTML. For example, a library for use can include Beautiful Soup, which is a python library to pull the data from HTML and XML files. Using this library following parsing functions for each of the tags (input, select, and label) were created. Other variations on the approach are possible.

Figure 6:
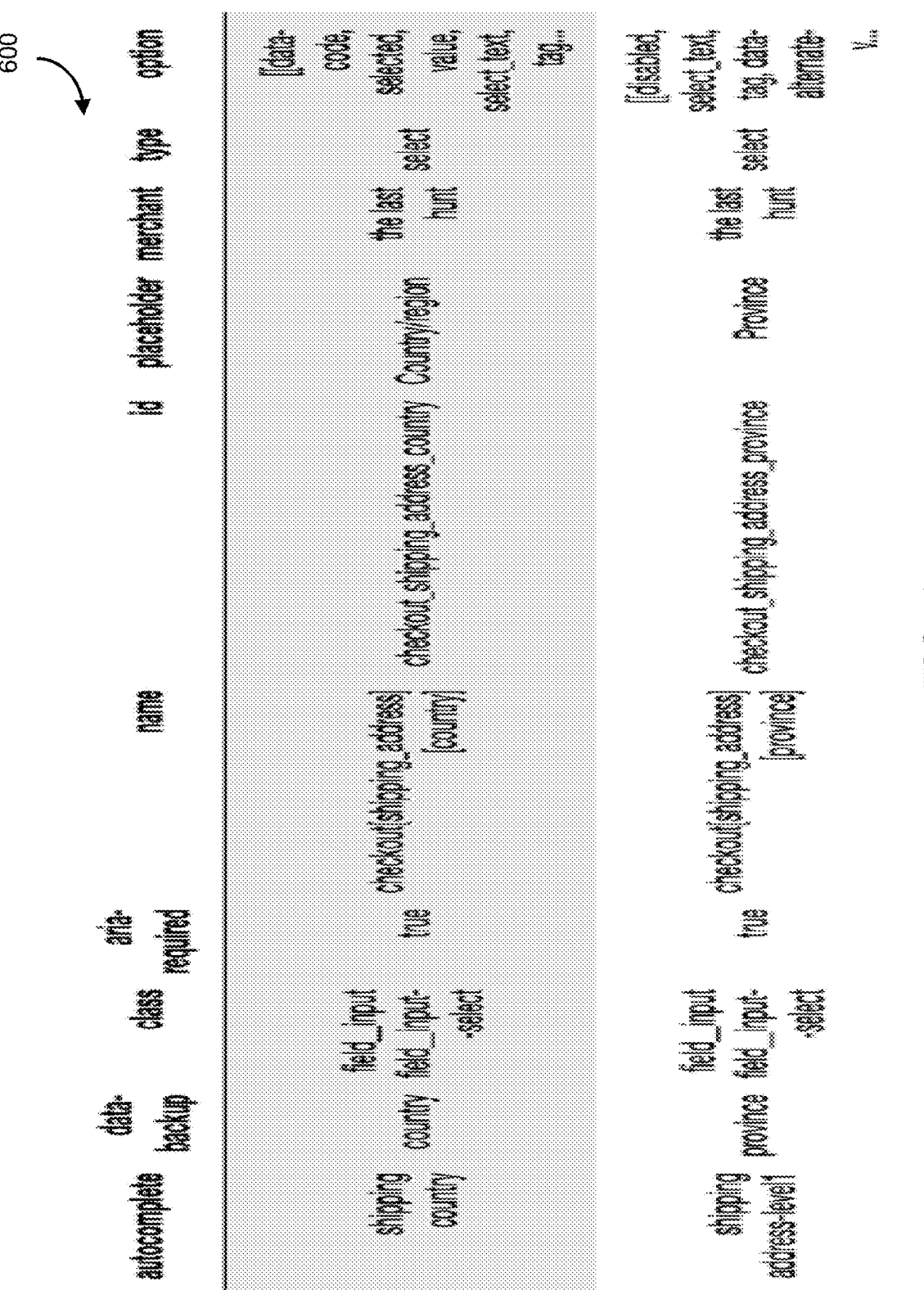
FIG. 6 shows an example set of parsed select tags.

FIG. 5 shows an example set of parsed input tags. In table 500, a number of different tags are shown as examples. When the system parses the input tag from the html page, many other attributes are obtained, and these attributes might be different from merchant to merchant. However, each input tag will contain some standard attributes such as "id", "class", "name", 'type',' etc. which is more relevant to the system, and other attributes may be filtered out during data cleaning process FIG. 6 shows an example set of parsed select tags. In table 600, a number of different tags are shown as examples.

Figure 7B:

FIG. 7A, FIG. 7B, FIG. 8, and FIG. 9 are examples from a checkout simulation. In FIG. 7A, FIG. 8, and FIG. 9, an approach is shown in screenshots and associated code snippets 700A, 800, and 900. In particular, tags can be labelled, and labels in checkout pages are as shown in the following Retailer.ca checkout page, if they exist. In most of the cases. it will have attribute "for" which is referring to the "id" in input field. FIG. 7B is an annotated diagram 700B that is annotated to illustrate terminology and different interface elements that are used in the approach described herein.

FIG. 10 shows an example set of field names, tags, and type. Table 1000 shows an example for a retailer.

Labels can have three types of attributes: (1) To identify the field: "id", "class", (2) Label for which field: "for" which is referring to the "id" in the following input/select field, and (3) Text in label: text (This is what user sees as a label on top of each field if exists)

Previous and Next label: After parsing the label tag, one more function was created to add the previous label and next label, if previous label is not present then it is filled with "start" and the last element of the next label will be "end" if no other label present. For example in the previous picture of Retailer.ca checkout page, for "Last Name" the previous label will be "First Name" and the next label will be "Address line1", but in case of "First Name" previous_label will be "start".

Concatenating all tags: All of the tags per merchant can be combined together to form the final dataframe for further analysis. For the training, while select tags are not described in this example, the approach can be extended to use these tags. For simplicity, in this example with respect to data preparation, the approach will consider input tags and label tags only. A parsed input dataframe can be merged with parsed label dataframe on the keys: id(input) and for (label). If labels are not present then, the approach can include imputing the values using the other keys in input attributes such as: placeholder, aria-label, aria-labelledby, name, id.

1. If labels are not present then the system can compute the label_fuzz using the other keys in input attributes such as: placeholder, aria-label, aria-labelledby, name, id, autocomplete, and select_text. To generate the label fuzz we use the lavenstein distance between these attributes with hand labelled. these label_fuzz will be the labels for the input/select fields when actual label tags are not present or don't have 'for' attribute to connect with input tag or select fields. or to impute the labels when needed.

in short: label_desc=label_fuzz if label tag of the field is not present otherwise the system can use label_fuzz to impute label_desc if needed 2. Using the label_desc, previous labels and next labels will be created.

Afterwards, previous and next tags will be created before merging with input tag dataframes.

FIG. 11 and FIG. 12 depict a merged screenshot of a same data frame. FIG. 11 extends to FIG. 12 across tables 1100 and 1200 due to space constraints in respect of columns.

The parsing functions proposed will work in most of the merchant checkout pages, but still there are many challenges to parse the data as every page is different. Accordingly, an approach is proposed herein below to address and discuss various scenarios.

Some merchants might not have the label tags instead they use other attributes such as placeholder, aria-label, etc. to help the user to identify the field. For these, for the training data collection, merchants without label were not included. For testing if merchant doesn't have labels, then the values for the label_text, previous_label, and next labels will be imputed using one of the fields: placeholder, aria-label, name, id.

These functions were created based on the portion (e.g., chunk) of the html code related to the fields, in case of full page given this code has be modified accordingly.

Some of merchants did not have the Id for the input/select tags, these fields were excluded from the training data.

In order to fill back these values ids and name were used, otherwise some other field locator should be gathered in data collection.

Most of the checkout pages are customer specific and had some timed sessions, and one cannot simply copy the url and parse it (most of the cases)

Each checkout page has at least two separate pages (one for address and other for payment). To address this, the inference process can be repeated for each form separately.

In some of the merchant, if previous field is not filled then it will not expand the whole form. For example, field for expiration date and cvv will not expanded (shown) unless 16 digits of card number is typed.

Getting a source code for each of the checkout pages is quite challenging as sometime, URL is same but source code changes between different tabs, also sometimes while adding the entries source code changes.

The data shown in FIG. 11 and FIG. 12 is for certain exception retailers who have different flows for logins. For example, in certain situations, this was utilized to indicate that data collection may not be straight forward as, some of the merchants might not have the guest checkout page for data collection. Accordingly, in some embodiments, certain retailers login to an account or create/register as a user in order to do the checkout. So in order to get the data from checkout page, one can login with an account and obtain the checkout data.

An approach for hand labelling labels is described below. FIG. 13 is an example set of hand labels. Table 1300 shows a set of variations in labels, corresponding hand labels, tags, and type. A checkout page has roughly 10 fields for address and 5 fields for payments, but sometimes their labels are varying in format or labels itself.

In the hand labels, the select typed labels are filtered out from the training and further data cleaning such as: Province, Country, Expiry mm, Expiry yy.

An example set of hand labels are shown below.

| variations in labels | Hand_labels | Tags | Type |
|---|---|---|---|
| first name, given name | name_first | input | text |
| last name, family name | name_last | Input | text |
| name, full name | name_full | input | text |
| email, email address, Email address | email_full | Input | email |
| phone number, phone, contact number, mobile number | phone_full | Input | Tel |
| address, addressline1, address line1, street address | address_line1 | Input | text |
| app, suits, floor, apartments, addressline2, address line2 | address_line 2 | Input | Text |
| city, town | address_city | Input | Text |
| province, state, region | address_province | Input with maxlength more than 3 | text |
| | | select with optionTag-text is full name of a province | text (generated based on type of optionTag- text) |
| | address_province_2 | Input with maxlength is less than or equal to 2 | text |
| | | select with optionTag-text is province iso 2-ON, AB | text (generated based on type of optionTag- text) |
| | | input tag with null maxlength | text |
| | address_province_3 | select with optionTag-text is province iso 3-ONT | text (generated based on type of optionTag- text) |
| country, region | address_country | Input with maxlength more than ¾(check the data) | text |
| | | select with optionTag- text is full name of a country | text (generated based on type of optionTag- text) |

-continued

| variations in labels | Hand_labels | Tags | Type |
|---|---|---|---|
| | address_country_2 | Input with maxlength is less than or equal to 2 | text |
| | | select with optionTag-text is country iso 2-CA, US | text (generated based on type of optionTag- text) |
| | | input tag with null maxlength | text |
| | address_country_3 | select with optionTag-text is country iso 3-CAN | text (generated based on type of optionTag- text) |
| postalcode, post code, postal code | address_postal | Input | Text |
| card number, card details | card_number | Input | Text/number |
| expiry mm, month, expiry month, exp mm, etc. | card_expiry_mm | Input with maxlength 2 or less | number/text |
| | | input with null maxlenth | number/text |
| | | select with optionTag-text has numeric list such as [01, 02, 03] | number (generated based on type of optionTag-text) |
| | card_expiry_mon | select with optionTag-text has a 3 letter list such as [Jan, Feb] [01-Jan, 02- Feb] | text (generated based on type of optionTag- text) |
| | card_expiry_month | select with optionTag-text has a list of months such as [January, February] | text (generated based on type of optionTag- text) |
| expiry yy, year, expiry year, expiration year, etc. | card_expiry_yy | Input with maxlength 2 or less | number/text |
| | | select with optionTag-text has numeric list such as [23, 24, 25] | number (generated based on type of optionTag-text) |
| | | Input with null maxlength | |
| | card_expiry_yyyy | Input with maxlength 4 or more | number/text |
| | | select with optionTag-text has numeric list such as [2023, 2024, 2025] | number (generated based on type of optionTag-text) |
| expiration, expirymm/yy, mm/yy, mmyy etc | card_expiry_mmyy (when formate is mm/yy or mm/yyyy) | Input | Text/number |
| cvv, cvd, security code etc. | card_cvv | Text | Number |
| name on card, card owner, name of the owner etc. | card_name | Input | text |

As the problem was to classify these labels correctly, the approach can include hand labelling the given collected data by observing various fields such as name, aria-label, aria-labelled by, type and label_text itself. In an example, Applicants have considered Retailer page as the reference for the labelling the target variable.

FIG. 14 is a set of cleaned data labels in this example. In FIG. 14, table 1400 shows actions relating to drop and imputation, and describes the approach for imputation thereof. Note: some of the labels were related to company info, amount, which were dropped as there were only once occurrence of were found.

Text cleaning: As some of the features were textual features, these features were cleaned using some regex operations and stop words. Furthermore, if the length of the text was >50 then keywords were identified and kept that part of text as label.

Categorical variable: Input field will have various types such as: 'email', 'text', 'tel', 'number', 'radio', 'checkbox', etc, but in this example, the approach will only keep 'email', 'text', 'number', 'tel'.

| name of categorical variables | options | important options for training |
|---|---|---|
| type | 'email', 'text', 'tel', 'number', 'radio', 'checkbox', 'phonenumber', 'postalcode' etc | 'email', 'text', 'number', 'tel' converted: |

-continued

| name of categorical variables | options | important options for training |
|---|---|---|
| tagName | input, select, label | 'postalcode' to 'number' 'phonenumber' to 'tel' input, select |

Class Distribution:

```
In [3]:     data ['hand_labels'].value_counts ( )
Out [3]:    phone_full            236
            name_last             220
            name_first            220
            address_postal        204
            address_line1         190
            email_full            187
            address_city          186
            address_line2         171
            address_province      164
            card_number           135
            address_country       124
            card_cvv              109
            card_expiry_mmyy       84
            card_name              70
            card_expiry_yyyy       41
            card_expiry_mm         35
            address_province_2     29
            address_country_2      24
            address_full           20
            card_expiry_mon        18
            name_full              18
```

-continued

| | |
|---|---|
| card_expiry_yy | 14 |
| card_expiry_month | 13 |
| Name: hand_labels, dtype: int64 | |

Imbalanced Dataset: Some of the classes have very few observations, and Applicants have identified patterns and oversampled those classes (e.g: address_full, card_expirry_mon, address_country_2) which improved the performance of the model. Overall, the XGBoost model is able to handle the imbalanced dataset well, but another proposed approach is to use some libraries such as imlearn to attempt some oversampling techniques. Experiments were conducted with Random over Sampling from imlearn, but a drawback is that it sometimes overfit the model.

Feature selection is proposed herein that is not performance based, but knowledge based.

In the example shown below, only type, class, id, maxlength, label text, previous label, next label columns were selected for the training data as shown below. Furthermore, id and class will be dropped from the training dataset, but later they can be used in testing to fill in the forms as a pointer.

Figure 15C:
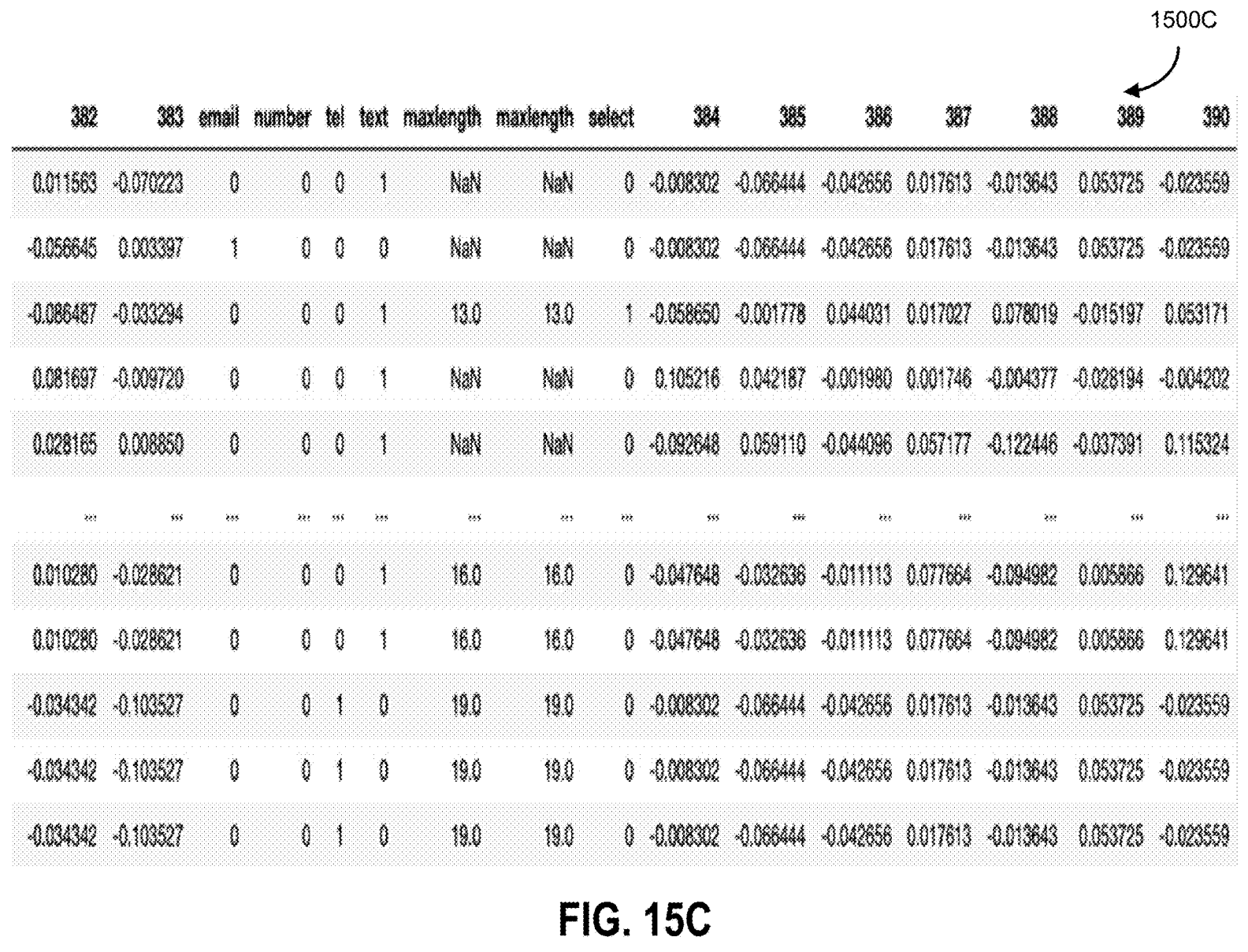

FIG. 15A and FIG. 15B are two example sets of selected features. As shown in table 1500A and 1500B, features are shown having type, maxlength, and different label aspects. FIG. 15C shows an example data frame 1500C. As a final data frame, embedding of label_text was concatenated, previous_label_embedding, next_label_embedding, dummy variables of type and tagName, maxlength, target.

Once data is clean and id and class features were removed, duplicate rows will be dropped as they don't contribute new to the model and avoid overfitting.

Some of the classes have very few observations, and Applicants have identified some patterns and over sample those classes (e.g., Full name) which improved the performance of the model.

An approach to feature engineering is proposed where, for example, new features were created using previous label and next labels (e.g., two new features). Two new features were created such as previous label and next labels.

Data Transformation:

| Feature | Transformation |
|---|---|
| label_text | 384 dimensional dense Word embedding using sentence transformer model all-MiniLM-L6-v2 |
| type | Dummy features were created using one hot encoding |
| tagName | Dummy features were created using one hot encoding and dropped input column(as it has two categories) |
| previous_label | 384 dimensional dense Word embedding using sentence transformer model all-MiniLM-L6-v2 |
| next_label | 384 dimensional dense Word embedding using sentence transformer model all-MiniLM-L6-v2 |
| hand_label (target) | integer encoding using Label_encoder( ) |

As a final data frame, embedding of label_text was concatenated, previous_label_embedding, next_label_embedding, dummy variables of type and tagName, maxlength, target.

This was done as in following steps:

1. For each of the features created, conduct word embedding using sentence transformer model all-MiniLM-L6-v2 which maps sentences or paragraphs to a 384-dimensional dense vector.

2. Find appropriate cluster number for each of the features.

3. Replace the text by the associated cluster number.

Figure 16:
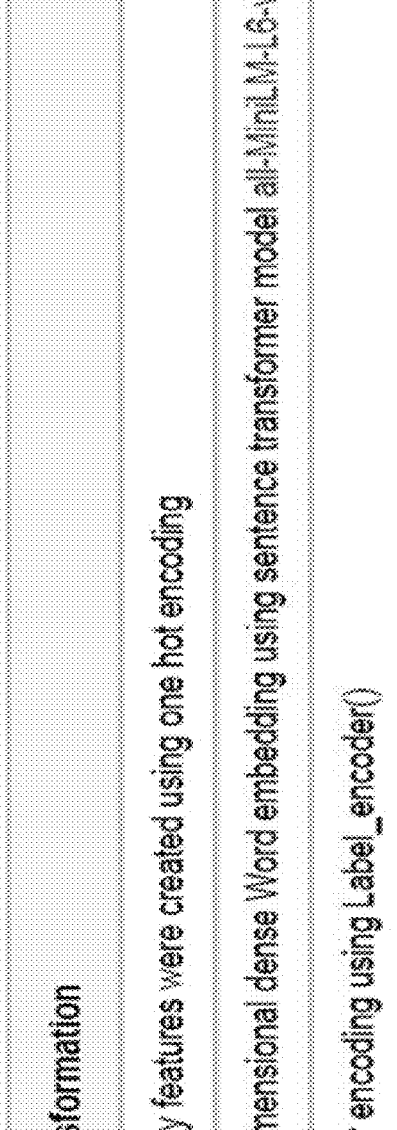
FIG. 16 is an example table showing steps for a data transformation.

FIG. 16 is an example table showing steps for a data transformation. As shown in table 1600, the features are associated with a specific transformation.

As a final data frame, embedding of label_text was concatenated, previous_label_cluster, next_label_cluster, dummy variables of type, maxlength, hand_label.

Normalized Data: Data was normalized using the StandardScalar( ) before modeling. As there may be features which are text and not a categorical variable. the system in some embodiments had to convert them into numbers so it can represent the meaning of the text from this numerical vectors. Nowadays, transformers were trained on billions of documents make machine understand the textual data not only that but should be able get some kind of semantic understanding between the text using these numerical vectors. For example, using transformers, the system can b configured to create word embeddings (e.g., numerical vectors) which will help machine to understand that king and man are similar than king and woman. Same way in this case, an approach is to use a pre-trained sbert model, where the bert model is trained on a diverse set of 1B sentence pairs.

There can be three features "Label", "Next Label", "Previous Label"

Labels of the input fields are not just one word, but most of the times more than one word and in case they are imputed, then they could be small sentences, e.g. "please enter your full name". The system of some embodiments used sentence transformer pre-trained models to create the word embedding for each of the three features: "Label", "Next Label", "Previous Label". As mentioned earlier, transformer based word embedding finds the semantic similar text together, keeping this aspect in mind. the model can pick up that first name and address line1 is different. and address line1 and address line2 or street address are similar.

Also, to provide more context, it also matters what follows what. usually addressline 2 is followed by address line1/street address. Therefore to provide some positional context, the system can be adapted to utilize cluster number for the next and previous labels. but this label changes sometimes for example street address will be replaced by address line1. In this case model sees the pattern that if word embedding and with some fixed numbers around is address line2.

There can be one categorical variable: "type". Type can have various categories. In an example cases, there can be "email", "text", "number", and "tel", which was encoded as one hot encoding, that means any field will be only of one type for example if it is text the it will be encoded as (1,0,0,0) where 1 is text present and 0 for non present categorie. Maxlength: it is a numerical variable which was scaled. After this, the final feature vector for a given field will be concatenated word-embedding of a label, cluster number of a next label, cluster number of a previous label, one hot encoding of a type and maxlength. which makes 384+1+1+4+1=391 dimensional vector for a given field, according to a non-limiting example embodiment. Other numbers of dimensions are possible. FIG. 17 shows an example set of normalized data. A number of different normalized values are shown in table 1700.

Using the stratified KFold, various multi_label classification algorithms were trained to see the initial performance such as SVM, LDA, Decision Tree, Random Forest, XGBoost, Random Forest. XGBoost consistently gave the better results and due to interpretability XGBoost was chosen for the model prediction and performance evaluation.

Figure 18:
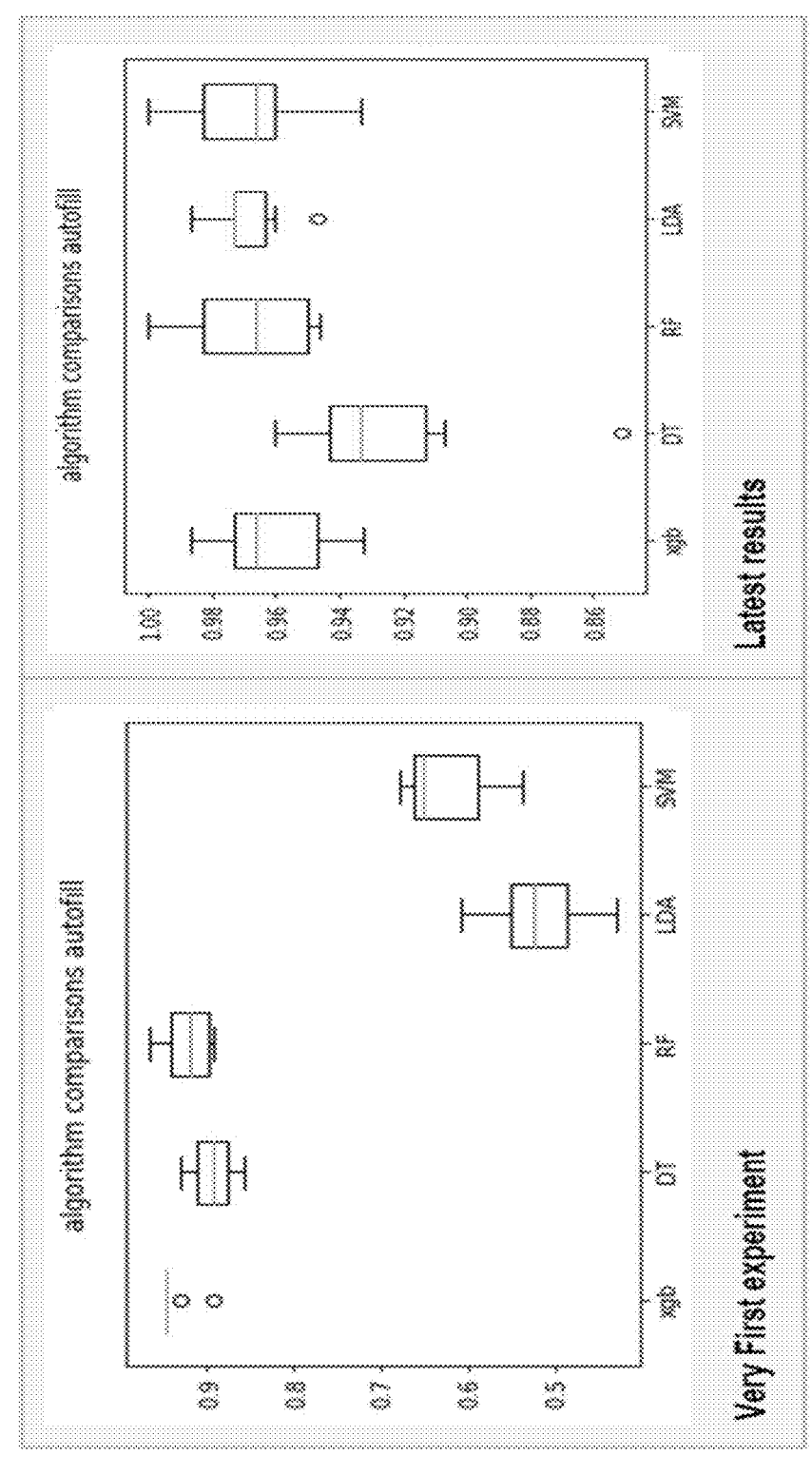
FIG. 18 shows example algorithm comparisons, according to some embodiments, showing improved results as the prototype design was updated.

FIG. 18 shows example algorithm comparisons, according to some embodiments, showing improved results as the prototype design was updated. FIG. 18 shows two sets of performance analyses at 1800.

In the first experiment shown, the approach did not the next and previous labels, but from the comparison of the models XGBoost performed better, and that led Applicants to consider the use of XGBoost.

One can observe that XGBoost still not the best in the second experiment. Other approaches are possible, but in order to compare our previous and new results, Applicants kept the model the same. In the results: as mentioned in the above paragraph that the first experiment in FIG. 18 was with just "type", "maxlength", and "label". In the second experiment, the experiment added Next-label and previous-label which helped the models in predicting some classes better. For example, when the approach was used to predict "Full name" as Name (first+last name), the first experiment predicted it as "first name" which is not correct. But when Applicants modified the system to add the next-label and previous-label with enough sample size of that particular class, the model was predicting "Full Name" as "Name" which was correct. This also provide significance of having next- and previous labels as features.

An example set of predicted classes is noted below as a non-limiting example:
Predicted Classes:

| parameter | description |
|---|---|
| random__state | generate same results at every run |
| eta/learning rate | regularization parameter |
| n__estimators | no of boosting tree |
| subsample | to build each tree takes 80% of data points(helps not to overfit) |
| colsample bytree | for each tree takes 50% of columns (helps not to overfit) |
| max__length | how much deep wants to expand the tree |
| min__child__weight | could grow up to single element at the end |

Figure 20A:
FIG. 20A is an example set of values for showing feature importance, according to some embodiments.
Figure 20B:
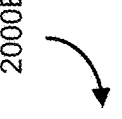
FIG. 20B is a second example set of values for showing feature importance, according to some embodiments.

FIG. 20 is an example set of values for showing feature importance, according to some embodiments. The values shown in 2000 are examples.

In experimental results, an accuracy value was found at 0.9580155497963718.

FIG. 21 is a confusion matrix showing example results. In 2100, for multi-class classification problem, it is desired to see how model performs in each of the class. In order to measure class-wise performance Applicants have captured two metrics. The confusion matrix which shows how many were correctly predicted and how many were not correctly predicted. y-axis is the actual label and x-axis represents the predicted labels.

In multi-class classification problem, obtaining just accuracy is not particularly helpful in understanding the model's performance over each of the class. Hence, Applicants have included confusion matrix and classification report to measure the performance at class level. which include the precision, recall and f1 score for each of the class. These gives better understanding for each class prediction.

| | predicted class | sample | description | availability |
|---|---|---|---|---|
| 1 | name__full | john doe | | |
| 2 | name__first | john | | |
| 3 | name__last | doe | | |
| 4 | address__full | 88 queens quay w | | |
| 5 | address__line1 | 88 queens quay w | | |
| 6 | address__line2 | | | |
| 7 | address__city | toronto | | |
| 8 | address__postal | m5j0b6 | | |
| 9 | address__province | ontario | | |
| 10 | address__province__2 | on | | |
| 11 | address__province__3 | ont | | |
| 12 | address__country | canada | | |
| 13 | address__country__2 | ca | | |
| 14 | address__country__3 | can | | x |
| 15 | phone__full | 4163483888 | | |
| 16 | email__full | john.doe@gmail.com | | |
| 17 | card__number | | | |
| 18 | card__name | johnathan doe | | |
| 19 | card__expiry__yy | 24 | | |
| 20 | card__expiry__yyyy | 2024 | | |
| 21 | card__expiry__month | january | | |
| 22 | card__expiry__mon | jan | | |
| 23 | card__expiry__mm | 05 | | |
| 24 | card__expiry__mmyy | 0524 | | |
| 25 | phone__counry__code | +001 | usually with previous or next field with phone number | |

FIG. 19 shows pseudocode for showing the base model, according to some embodiments. While XGBoost is shown at 1900, other classifiers are possible.

The model was tuned with the following hyperparameters: XGBClassifier(random_state=85, eta=0.1, n_estimators=100, njobs=−1, subsample=0.8,colsample_bytree=0.5, max_depth=6,min_child_weight=1).

In the confusion matrix, x-axis represents the predicted label and y-axis represents the actual labels. Addition of all horizontal number gives the total number of occurrence of that particular label in testing data. For example: "address line2" have (0, . . . , 0, 1, 17, 0, 0, . . . , 0) that means in this testing data there were 18 instances with actual label address line2. And out of those 18, 17 times it was predicted as "address line2" and 1 time it is predicted as "address line1". Which is nothing but "recall" (True positive/(True positive+ False negative)). Hence, recall for "address line2" will be 17/18=0.94 (match with classification report below). precision is 1 as no other field is predicted as address_line2.

The confusion matrix is also gives an understanding of which label is getting confused with which label. For example "address line2" is getting confused with "address line1". This information can be used to help analyze why this is happening and what should we do to improve. In this case, there are two reasons: first "address line1" and "address line2" are similar semantically, second, Applicants have trained the model in this example on a small dataset so training on more data will help improve the performance.

FIG. 22 is an example classification report. Classification report: gives the precision, recall, f1-score and support for each of the class and overall accuracy. In 2200, the classification Report is another important metric to calculate the performance metric of a multi-class classification model. In classification report, Applicants calculate precision, recall, f1-score (harmonic mean of precision and recall), and support (number of occurrence of the class in the testing data) for each of the class. Furthermore, Applicants can get the overall accuracy and total number of data points in the test dataset.

Inference:

For the inference, Classification Model, Embedding model, Clustering models (next_label and previous_label)

and dictionary to impute the maxlength will be saved and loaded when needed. As an example, the steps inference can be conducted as follows:

User consent

Fetch the HTML form

Data collection (same as training)

Data prep steps (same as training except hand labeling) using previously saved embedding model, clustering models and maxlength dictionary Load the classification model and predict labels Match user information using predicted labels (for multiple, userid required)

Generate the java code: This will create a few lines of code for the html field locator (id/name etc) and corresponding user information (name, email, phone number etc.)

Fill it back into the html

FIG. 23 is an example set of query parameters for an application programming interface, according to some embodiments.

Figure 24:
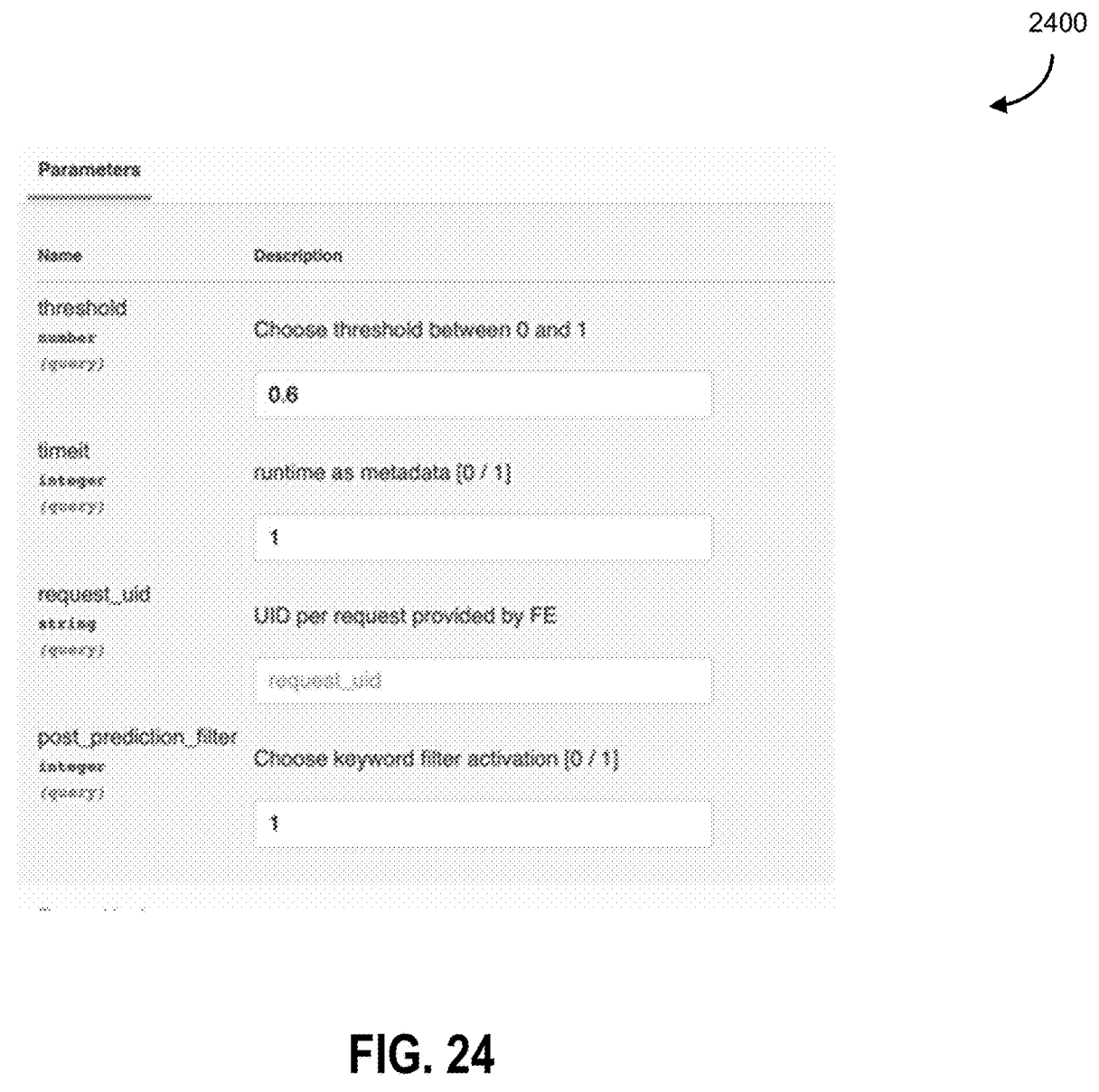

FIG. 24 is an example user interface screen configured for receiving a set of query parameters for an application programming interface, according to some embodiments.

Query parameters can include the following:

| query parameters | Default values | description | example |
|---|---|---|---|
| threshold | 0.6 | Float value between 0 and 1 to filter the predictions based on prediction score. | 0.60 |
| timeit | 0 | Integer value (either 0 or 1) to capture the runtime from data prep to model prediction. Value of 1 means runtime will be calculated, 0 otherwise. | 0 |
| request_uid | None | String value to uniquely identify the request per merchant/page (TBD) if request_id is provided: it will be concatenated (separated by "-") with span_id and returned as a pair ("request_uid"-"span_id") with response, otherwise only span_id will be send with the response | sample response if request_uid provided: span_id = "sifoii798768-2FNbP4yhoPbvWMsGXNrCvd" otherwise: span_id = "2FNbP4yhoPbvWMsGXNrCvd" |
| post_prediction_filter | 1 | to filter the non- required fields with high prediction probability score: filtered on keywords in the following list ['reward', 'redeem', 'coupon', 'gift', 'discount', 'company', 'promo', 'brand', 'type', 'nickname', 'ext'] for example: [ { "class": "form-group", "tagName": "label", "text": "" }, { "type": "text", "name": "gv_redeem_code", "class": "form-control", "id": "gv_redeem_code", "placeholder": "Enter Card Number", "translate": | without filter: { "prediction": [ { "id": "gv_redeem_code", "name": "gv_redeem_code", "class": "form-control", "label_desc": "enter card number", "prediction": "card_number", "prob": "0. 9712138", "autocomplete": "" } ], "meta": { "threshold": 0.6, "span_id": "oNCwQJQJX3bajjA5t9VMpF" } } with filter: { "prediction": [ ], "meta": { "threshold": 0.6, |

-continued

| query parameters | Default values | description | example |
|---|---|---|---|
| | "no", "input" } ] | "tagName": } | "span_id": "gtvbU98vk4cAzSB38Ar8d2" } } |

Figure 25:
FIG. 25 is an example set of payload parameters, according to some embodiments.

FIG. 25 is an example set of payload parameters, according to some embodiments.

Payload parameters can include the following:

Json input parameters

| tagName | HTML field attributes | Description | Example |
|---|---|---|---|
| input/select | id | unique identifier for an element. commonly used to associate a label with its corresponding form element | 'TextField1', "dwfrm_singleshipping_shipping-Address_addressFields_firstName" |
| | name | it specifies the name of an input field or form element. But unique identifier for a field when id is missing. | 'firstName', "dwfrm_singleshipping_shipping-Address_addressFields_firstName" |
| | class | it can belong to one or more element, but if id and name both are missing then could be used as an unique identifier. Note: Currently not used (BE/FE?) | "input-text float-input fname ttc required" |
| | type | this determines what kind of data can be entered or selected by the user. It could be ['text', 'email', 'tel', 'number', 'phonenumber', 'postalcode'] Note: 'phonenumber' will be converted to 'tel' and 'postalcode' to 'text' | 'text' |
| | maxlength | it specifies how many characters are allowed in input filed, Note: this is missing most of the time in select fields | '20' |
| | placeholder | this provides a hint or example text that is displayed in an input field before the user enters their own value. | "First Name", 'john' |
| | aria-label | it is used to provide an accessible label for an element that is not represented by a visible text label. | 'firstname' |
| | size | this specifies the width, in terms of characters, of an input field. | '20' |
| | tagName | whether the given field is input tag or select | 'input' |
| | autocomplete | autocomplete specifies whether a form or input field have autocomplete on or off and allows browser to predict the value | 'on', 'off', 'cc exp' |
| select (used to create a drop-down list) | optionTag | optionTag is a dictionary with at least two keys 'value', 'text' Note: 'value': this will be sent to the server for processing 'text': option text of the select options | { "value": [ "AB", "BC", "MB" ], "text": [ "Alberta", "British Columbia", "Manitoba" ] } |
| label (Description: label is usually a clear description of what information is expected in the corresponding form element) | for | usually associated with "id" attribute to associate the label with the input field Note: sometimes associated with 'name' attribute | "dwfrm_singleshipping_shipping-Address_addressFields firstName" |
| | text | clear description of an input field | "First Name" |

FIG. 26 is an example set of responses 2600, according to some embodiments.

Figure 27:
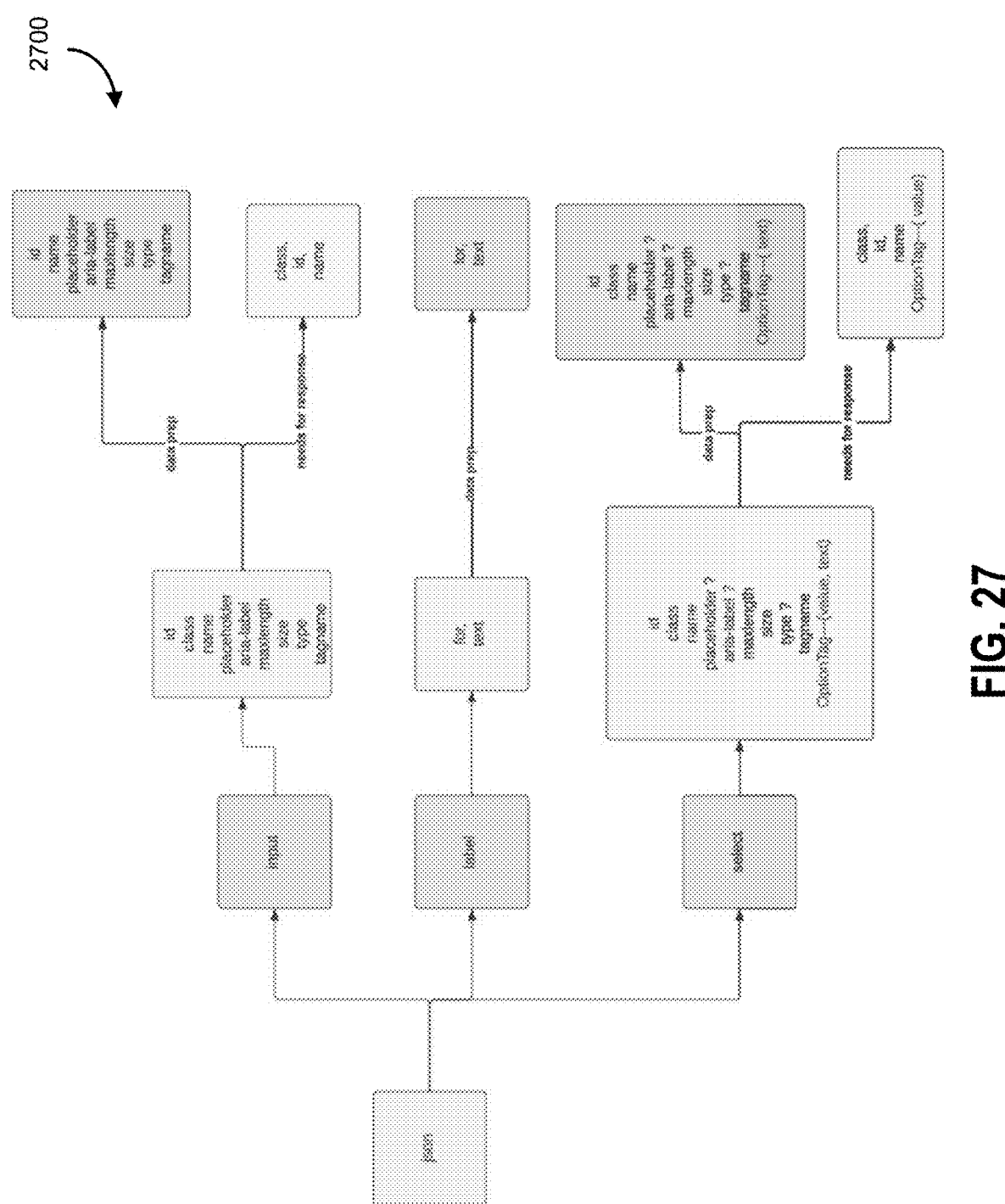
FIG. 27 is an example input JSON data object, according to some embodiments.
Figure 28:
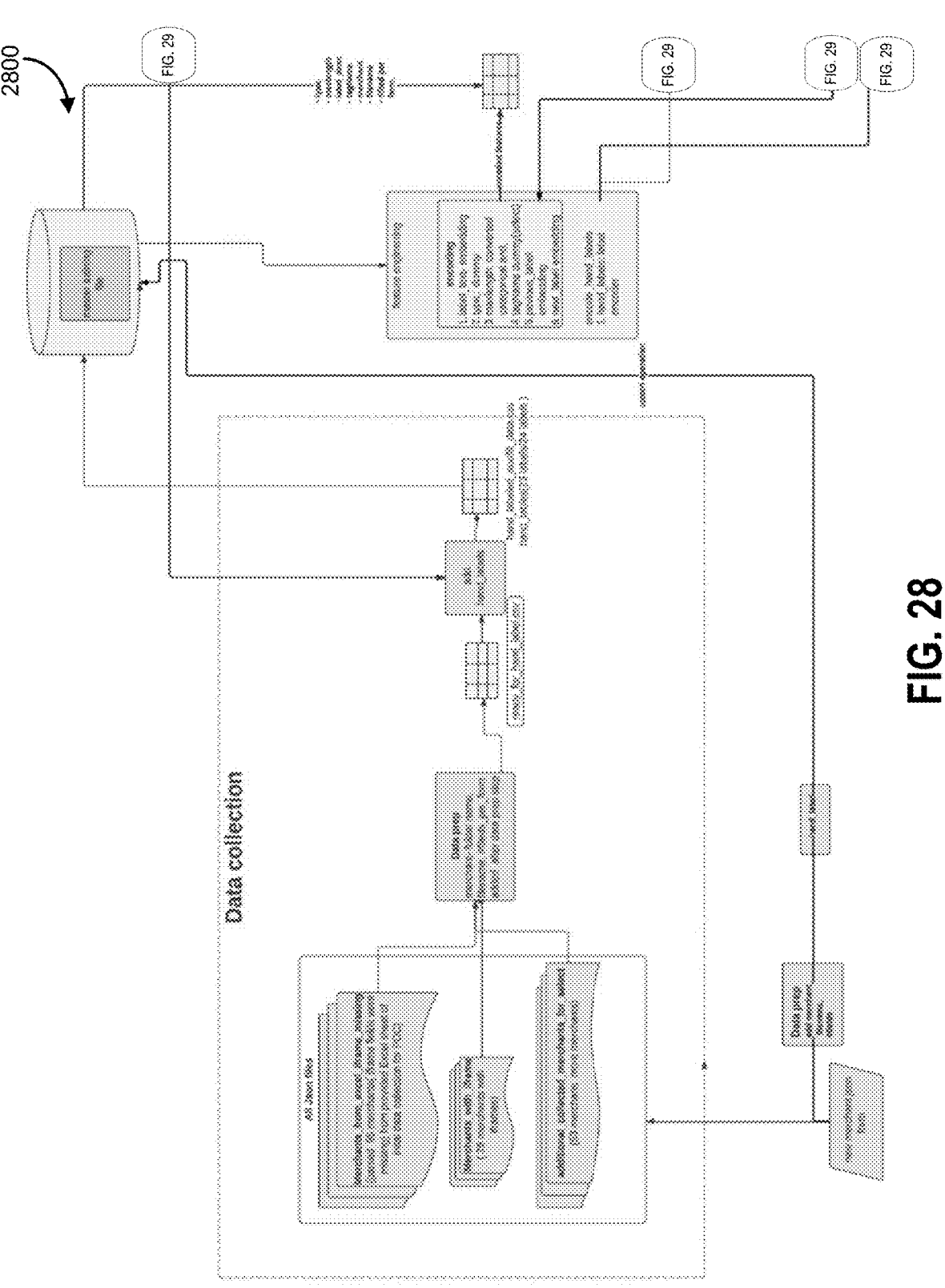
FIG. 28, FIG. 29, FIG. 30, FIG. 31, FIG. 32 are together a system diagram depicting a machine learning autofill system, according to some embodiments.
Figure 29:
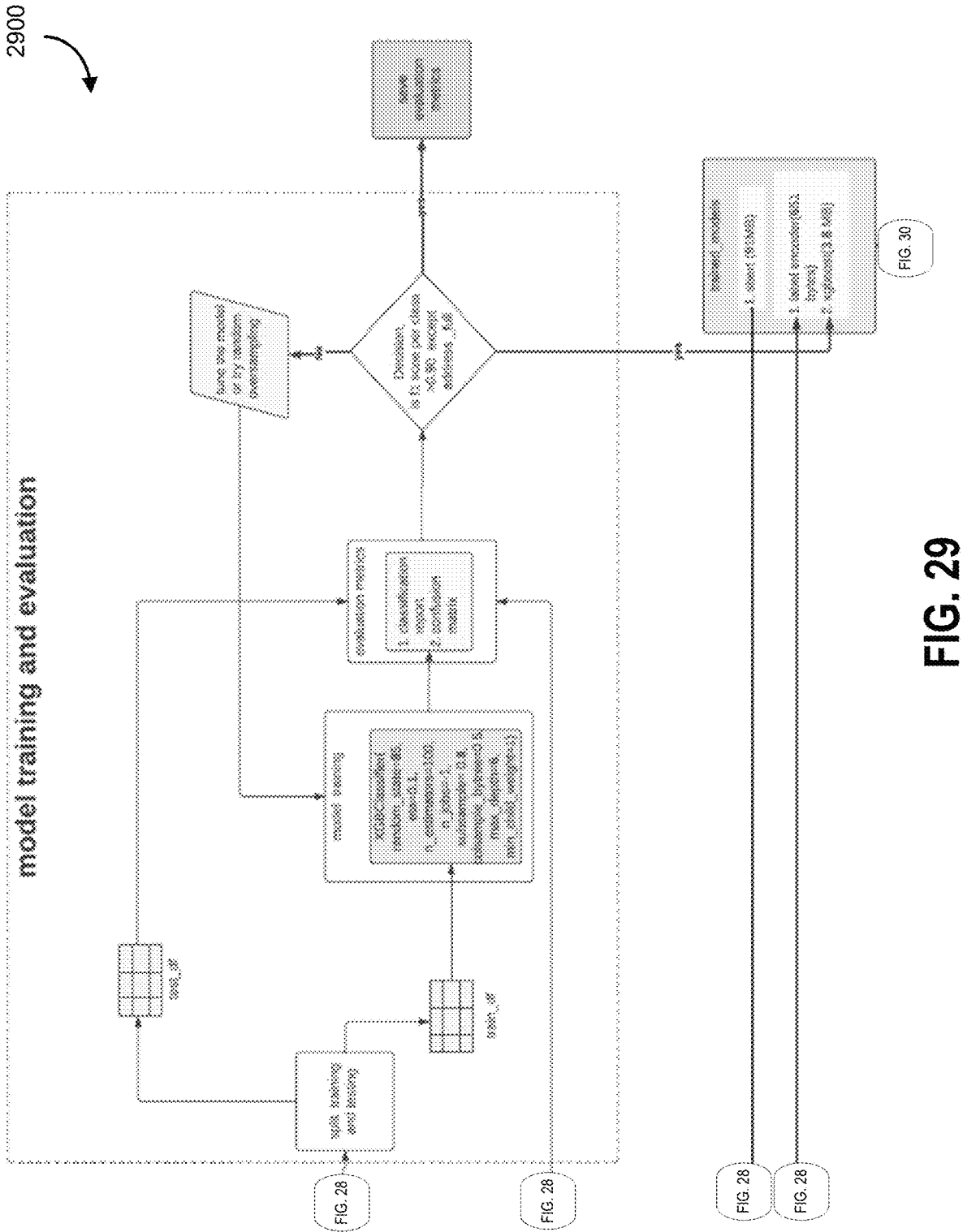
Figure 30:
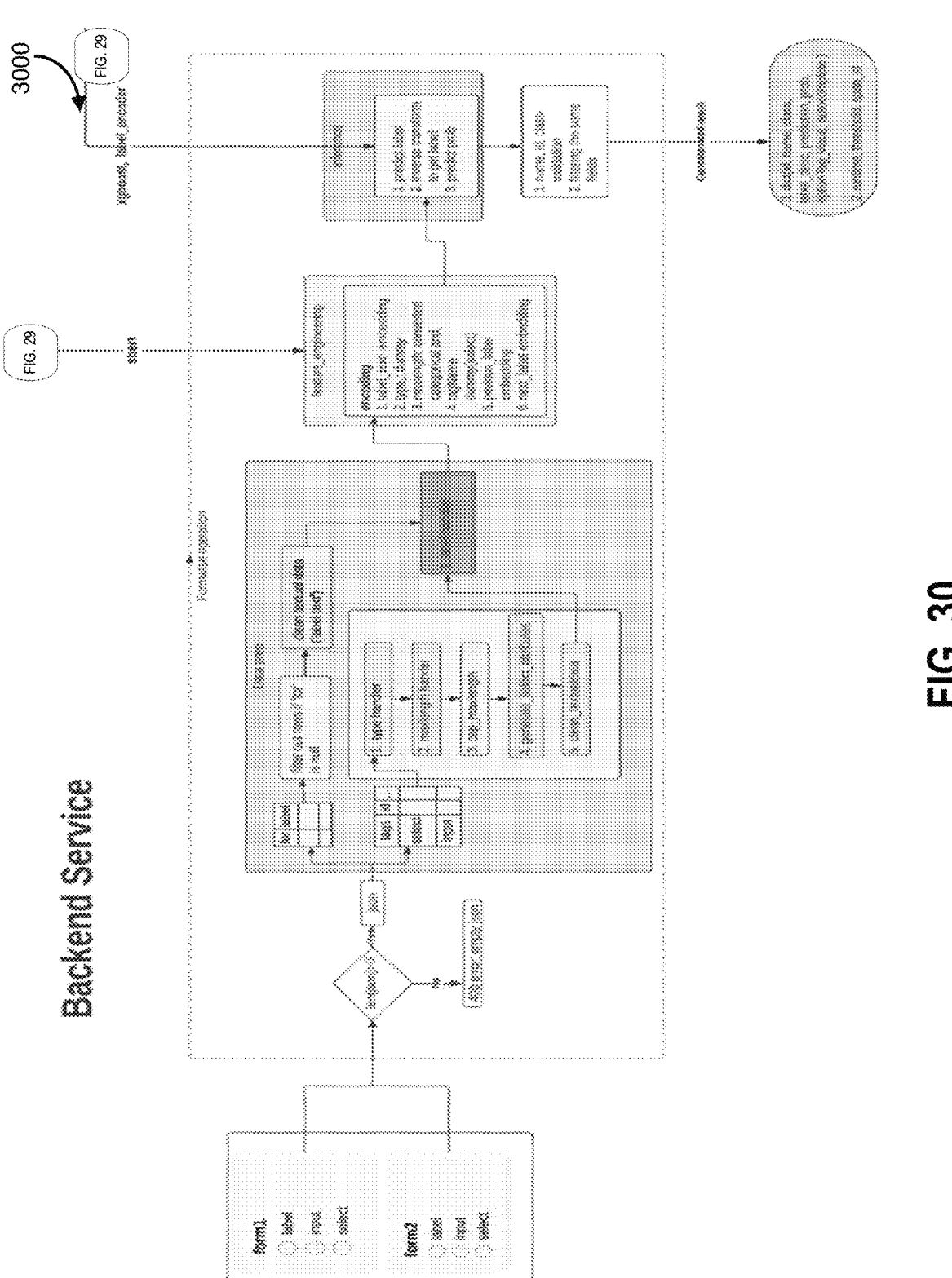
Figure 31:
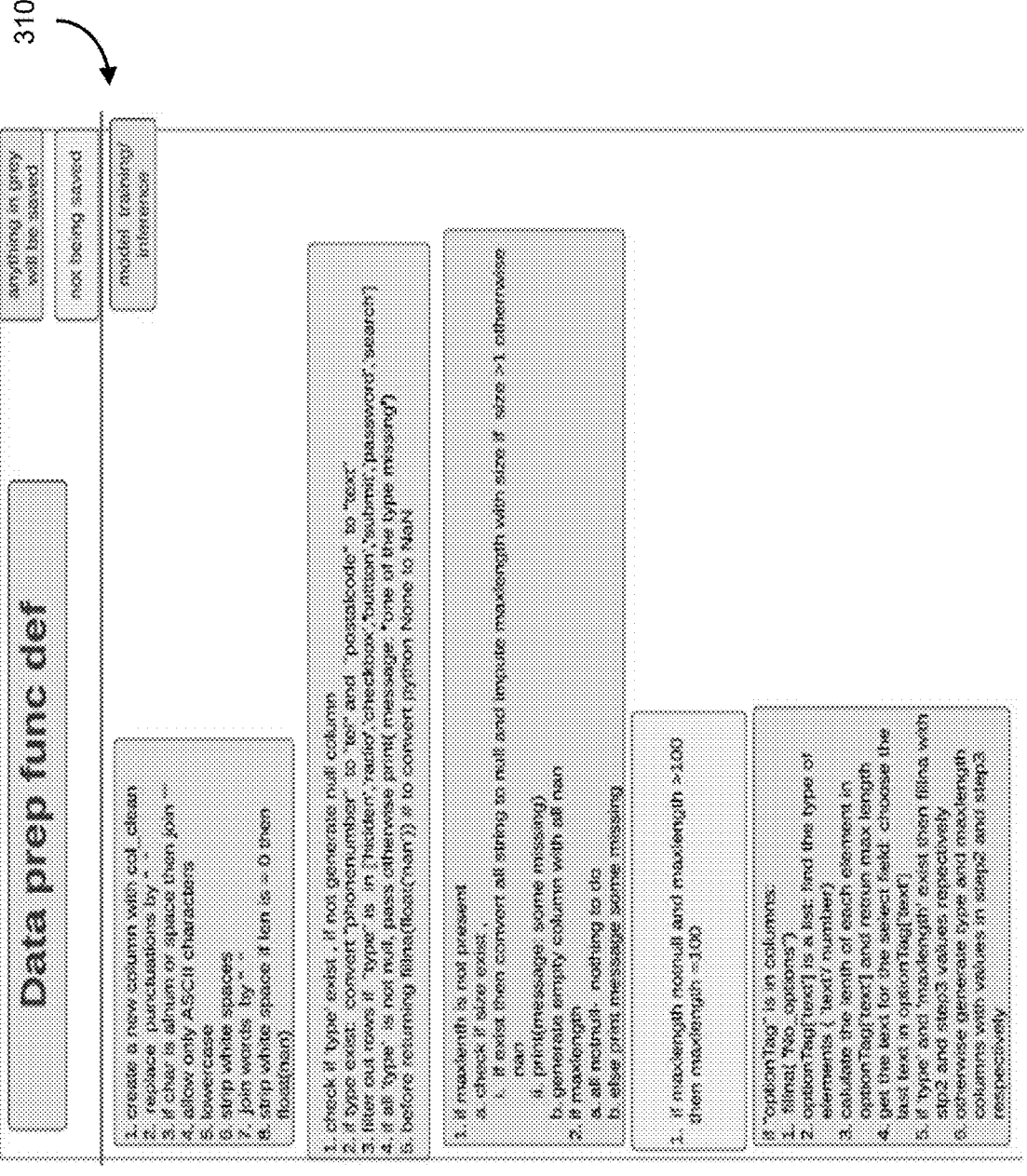
Figure 32:

FIG. 27 is an example input JSON data object 2700, according to some embodiments.

FIG. 28, FIG. 29, FIG. 30, FIG. 31, FIG. 32 are together a system diagram across illustrations 2800, 2900, 3000, 3100, and 3200 depicting a machine learning autofill system, according to some embodiments.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

APPENDIX

1: predicted classes:
['address__city',
 'address__country',
 'address__country__2',
 'address__full',
 'address__line1',
 'address__line2',
 'address__postal',
 'address__province',
 'address__province__2',
 'card__cvv',
 'card__expiry__mm',
 'card__expiry__mmyy',
 'card__expiry__mon',
 'card__expiry__month',
 'card__expiry__yy',
 'card__expiry__yyyy',
 'card__name',
 'card__number',
 'email__full',
 'name__first',
 'name__full',
 'name__last',
 'phone__country__code',
 'phone__full']

What is claimed is:

1. A computer implemented system for machine learning architecture for electronic field autofill with positional pattern recognition, the system comprising:
   a processor operating in conjunction with computer memory and non-transitory computer readable storage, the processor configured to:
   extract raw input data sets from one or more webpages, the raw input data sets representing raw markup language machine instructions used in rendering the one or more webpages;
   identify one or more input fields in the raw input data sets, and for each input data field, extract label information including a label, a previous label corresponding to a label of an immediately preceding input field, and a next label corresponding to a label of an immediately succeeding input field;
   extend the label information using feature engineering approaches including at least word embedding of label text using a sentence transformer model to generate dense vector representations of the label, the previous label, and the next label, and clustering approaches to associate each label with at least a type encoding, wherein the clustering approaches comprise:
   applying a clustering algorithm to the dense vector representations of the previous labels to generate a previous label cluster number for each input field, wherein semantically similar previous labels are clustered; and
   applying the clustering algorithm to the dense vector representations of the next labels to generate a next label cluster number for each input field, wherein semantically similar next labels are clustered;
   train a machine learning model architecture using the extended label information including the previous label cluster numbers and the next label cluster numbers to establish a trained machine learning model architecture;
   receive a new webpage having at least one input data field for inference; and
   for the at least one input data field, process the new webpage and associated markup language using the trained machine learning model architecture to identify a predicted label, and based on the predicted label, conduct an electronic field autofill of the at least one input data field.

2. The system of claim 1, wherein the extracted label information includes at least one of a maxlength of the label, a previous label, or a next label.

3. The system of claim 1, wherein the type encoding includes at least a cluster type encoding for the label, a previous cluster label, or a next cluster label.

4. The system of claim 1, wherein the feature engineering approaches include processing the raw input data sets using a sentence transformer model to conduct a mapping to a dense vector.

5. The system of claim 4, wherein the dense vector is utilized to determine the type encoding.

6. The system of claim 5, wherein determining the type encoding utilizes one-hot encoding.

7. The system of claim 6, wherein the extended label information is represented as a concatenated data frame.

8. The system of claim 1, wherein the machine learning model architecture is an XGBoost classification model, and the machine learning model architecture is trained until at least a threshold accuracy level is reached.

9. The system of claim 8, wherein the machine learning model architecture generates logit values representing predictions of labels for each of the at least one input data field, and a highest logit value is used to determine what information is used for the electronic field autofill.

10. The system of claim 1, wherein the machine learning model architecture resides on a backend server and copies of the trained machine learning model architecture are deployed to reside on local memory on user devices for conducting local electronic field autofill.

11. A computer implemented method using machine learning architecture for electronic field autofill with positional pattern recognition, the method comprising:

extracting raw input data sets from one or more webpages, the raw input data sets representing raw markup language machine instructions used in rendering the one or more webpages;

identifying one or more input fields in the raw input data sets, and for each input data field, extract label information including a label, a previous label corresponding to a label of an immediately preceding input field, and a next label corresponding to a label of an immediately succeeding input field;

extending the label information using feature engineering approaches including at least word embedding of label text using a sentence transformer model to generate dense vector representations of the label, the previous label, and the next label, and clustering approaches to associate each label with at least a type encoding, wherein the clustering approaches comprise:

applying a K-means clustering algorithm to the dense vector representations of the previous labels to generate a previous label cluster number for each input field, wherein semantically similar previous labels are clustered; and applying the K-means clustering algorithm to the dense vector representations of the next labels to generate a next label cluster number for each input field, wherein semantically similar next labels are clustered;

training a machine learning model architecture using the extended label information to establish a trained machine learning model architecture;

receiving a new webpage having at least one input data field for inference; and for the at least one input data field, processing the new webpage and associated markup language using the trained machine learning model architecture to identify a predicted label, and based on the predicted label, conducting an electronic field autofill of the at least one input data field.

12. The method of claim 11, wherein the extracted label information includes at least one of a maxlength of the label, a previous label, or a next label.

13. The method of claim 11, wherein the cluster type encoding includes at least a cluster type encoding for the label, a previous cluster label, or a next cluster label.

14. The method of claim 11, wherein the feature engineering approaches include processing the raw input data sets using a sentence transformer model to conduct a mapping to a dense vector.

15. The method of claim 14, wherein the dense vector is utilized to determine the type encoding.

16. The method of claim 15, wherein determining the type encoding utilizes one-hot encoding.

17. The method of claim 16, wherein the extended label information is represented as a concatenated data frame.

18. The method of claim 11, wherein the machine learning model architecture is an XGBoost classification model, and the machine learning model architecture is trained until at least a threshold accuracy level is reached.

19. The method of claim 18, wherein the machine learning model architecture generates logit values representing predictions of labels for each of the at least one input data field, and a highest logit value is used to determine what information is used for the electronic field autofill.

20. A non-transitory computer readable medium including machine-interpretable instructions, which when executed, cause a processor to perform steps of a method for using machine learning architecture for electronic field autofill with positional pattern recognition, the method comprising:

extracting raw input data sets from one or more webpages, the raw input data sets representing raw markup language machine instructions used in rendering the one or more webpages;

identifying one or more input fields in the raw input data sets, and for each input data field, extract label information including a label, a previous label corresponding to a label of an immediately preceding input field, and a next label corresponding to a label of an immediately succeeding input field;

extending the label information using feature engineering approaches including at least word embedding of label text using a sentence transformer model to generate dense vector representations of the label, the previous label, and the next label, and clustering approaches to associate each label with at least a type encoding, wherein the clustering approaches comprise:

applying a K-means clustering algorithm to the dense vector representations of the previous labels to generate a previous label cluster number for each input field, wherein semantically similar previous labels are clustered; and applying the K-means clustering algorithm to the dense vector representations of the next labels to generate a next label cluster number for each input field, wherein semantically similar next labels are clustered;

training a machine learning model architecture using the extended label information to establish a trained machine learning model architecture;

receiving a new webpage having at least one input data field for inference; and for the at least one input data field, processing the new webpage and associated markup language using the trained machine learning model architecture to identify a predicted label, and based on the predicted label, conducting an electronic field autofill of the at least one input data field.

\* \* \* \* \*